(12) United States Patent
Sato et al.

(10) Patent No.: US 6,388,667 B1
(45) Date of Patent: May 14, 2002

(54) IMAGE GENERATION DEVICE AND INFORMATION STORAGE MEDIUM

(75) Inventors: Kotaro Sato, Sagamihara; Takashi Masuyama, Yokohama, both of (JP)

(73) Assignee: Namco LTD, Tokyo (JP)

( * ) Notice: Subject to any disclaimer, the term of this patent is extended or adjusted under 35 U.S.C. 154(b) by 0 days.

(21) Appl. No.: 09/180,891

(22) PCT Filed: Mar. 18, 1998

(86) PCT No.: PCT/JP98/01152

§ 371 Date: Jan. 22, 1999

§ 102(e) Date: Jan. 22, 1999

(87) PCT Pub. No.: WO98/41952

PCT Pub. Date: Sep. 24, 1998

(30) Foreign Application Priority Data

Mar. 18, 1997 (JP) .............................................. 9-084385

(51) Int. Cl.[7] .............................................. G06T 15/00
(52) U.S. Cl. ...................................................... 345/473
(58) Field of Search ............................... 345/473, 474, 345/475, 418

(56) References Cited

FOREIGN PATENT DOCUMENTS

EP            0 840 279      *    6/1998

OTHER PUBLICATIONS

"Obujekuto–Shiko No Subete (All About Object Orientation)", *Interface*, pp. 154–155, 1994.
Leler, William. Actor–Based Simulation + Linda = Virtual Environments (Managing Complexity in a Virtual World), Northcon Conference Record, vol. 10, 1991, pp. 427–432.

Ma, Huadong, et al. "Intelligent Animation System", New Advances in Computer Advances in Computer Aided Design & Computer Graphics, vol. 1, 1992, pp. 121–124.

Dollner, Jurgen, et al. "Object–Oriented 3D Modelling, Animation and Interaction", The Journal of Visualization and Computer Animation, vol. 8, 1997, pp. 33–64.

* cited by examiner

*Primary Examiner*—Phu K. Nguyen
(74) *Attorney, Agent, or Firm*—Oliff & Berridge, PLC

(57) ABSTRACT

An actor management section (110) manages the generation, activation, execution per unit time, sleep, halt, restart and termination of actors (20) to (40) which are instances of a class and are also processes that can be executed in parallel and generates images such as those of a character (42), a stage (44), and an egg (46) which are each represented by these actors. Actors also include sound control actors, storage region management actors, and actor-to-actor communications actors. Each actor is managed on the basis of actor information stored in an actor structure. Details such as member variables and methods for each actor are described in scripts, and scripts, models, and disposition information can be combined and freely modified in real time. The execution code of a script used in common by a plurality of actors is stored in the same storage region. Using a shell, an operator can control actors interactively.

22 Claims, 19 Drawing Sheets

FIG. 3

| ACTORS |
|---|
| DISPLAY ACTOR (STATIC BODY, DYNAMIC BODY, etc.) |
| SOUND CONTROL ACTOR |
| INTERFACE ACTOR (WITH USER OR OTHER SYSTEM) |
| ACTOR-TO-ACTOR COMMUNICATIONS ACTOR |
| STORAGE MANAGEMENT ACTOR |
| PHYSICAL CALCULATION ACTOR |
| SEARCH/SORT ACTOR |
| DATABASE ACTOR |
| MANAGEMENT/ORGANIZATION ACTOR |
| ⋮ |

FIG.6A  FIG.6B  FIG.6C
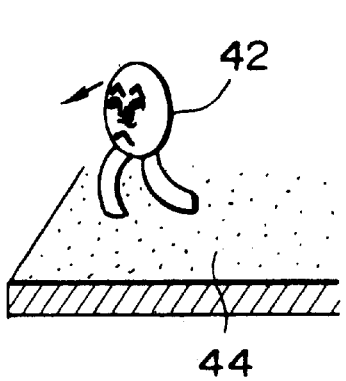 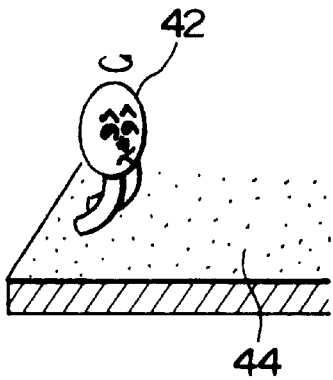 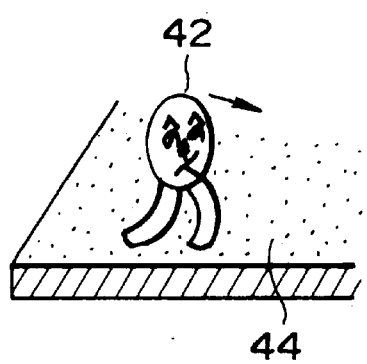
FIRST RULE
FIG.6D  FIG.6E  FIG.6F
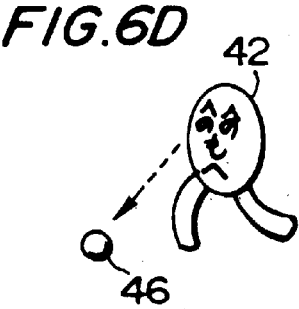 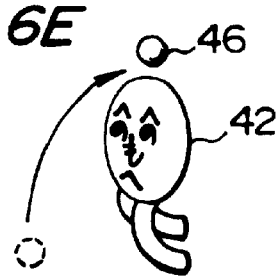 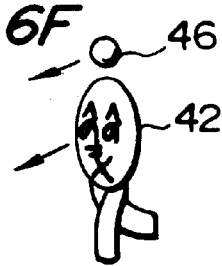
SECOND RULE
FIG.6G  FIG.6H  FIG.6I
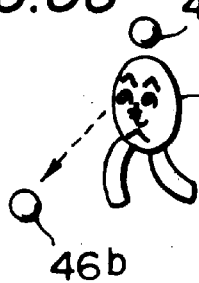 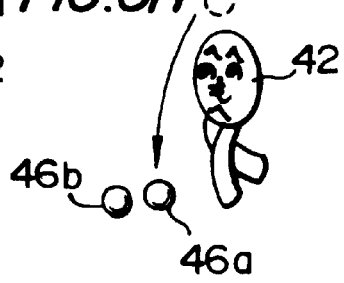 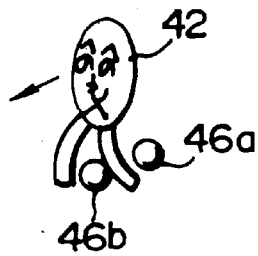
THIRD RULE

FIG. 7

ACTOR STRUCTURE

| ACTOR FLAG |
| --- |
| DISPLAY FLAG |
| TIME COUNT FLAG |
| LOOP FLAG |
| REAL ID OF ACTOR |
| VIRTUAL ID OF ACTOR |
| REAL ID OF PARENT ACTOR |
| REAL ID OF PARENT ACTOR FOR GEOMETRICAL CALCULATION |
| CURRENTLY USED SCRIPT ID |
| CURRENTLY USED MODEL GROUP ID |
| every_func POINTER |
| LIFETIME |
| ELAPSED TIME |
| TOTAL ELAPSED TIME |
| TIME UNTIL WAKE-UP |
| DISPOSITION INFORMATION OF ACTOR |
| CHILD ACTOR-RELATED INFORMATION |
| VIRTUAL ID OF ACTOR THAT LAST CAUSED AN ACTION WITH RESPECT TO THE SELF ACTOR, AND ACTION TYPE |
| ACTOR COMMUNICATIONS INFORMATION |
| ACTOR VARIABLE STORAGE REGION INFORMATION |
| ⋮ |

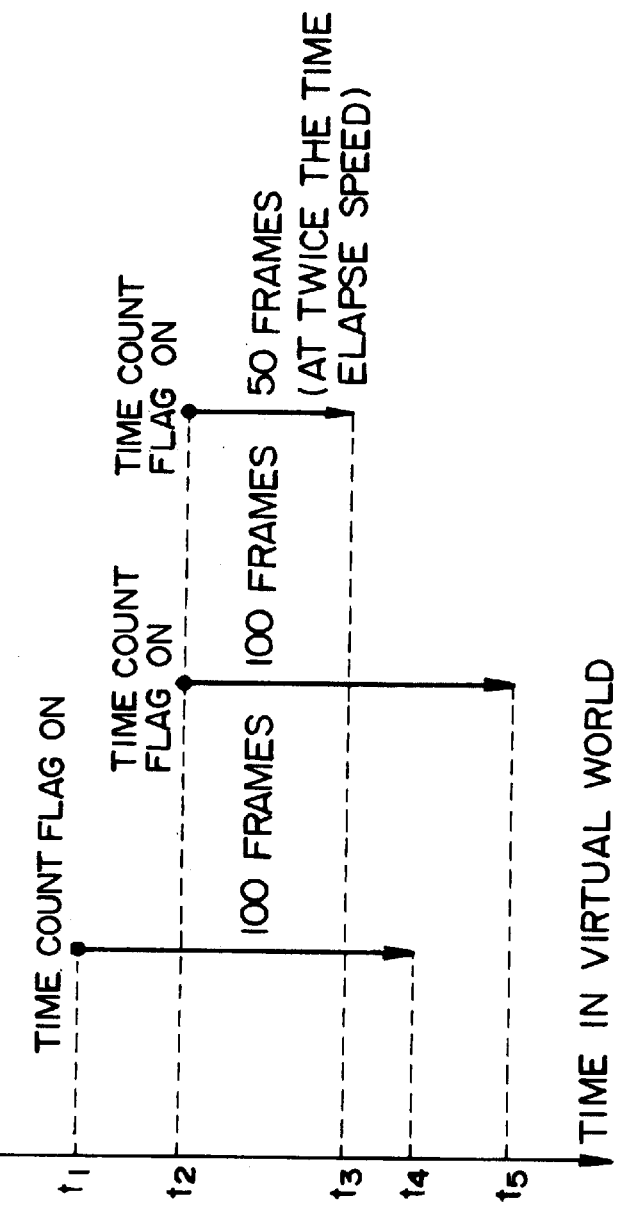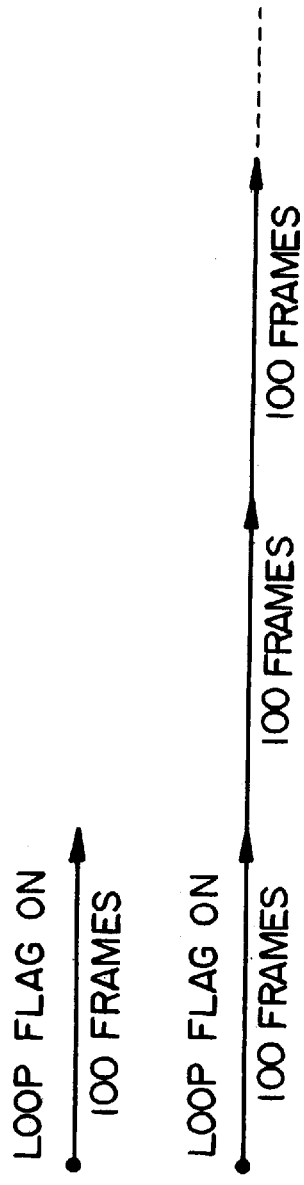
FIG.8A
FIG.8B
FIG.8C

FIG.12A
LEVEL-1 SCRIPT

```
:TORSO    SPECIFICATIONS OF PARENT
          FOR GEOMETRICAL CALCULATION
   tx    FRAME         INTERPOLATION  --
   ty    NUMBER        METHOD
         ----          ----           ----
   tz    ----          ----           ----
   rx    ----          ----           ----
   ry    ----          ----           ----
   rz    ----          ----           ----
   ⋮

:LEG1    PARENT  OBJECT  NAME
   tx    -----         ----           ----
   ty    -----         ----           ----
   ⋮

:LEG2    PARENT  OBJECT  NAME
   ⋮
```

FIG.12B  LEVEL-2 SCRIPT

```
HEADER INFORMATION
{
    # include   "---"
    # define    ---
       ⋮
}
ACTOR VARIABLES
{
    mi_short    $ aaa ;
    mi_short    $ bbb ;
    mi_short    $ ccc ;
}
create_only
{ ----         ----
}
fire_only
{ ----         ----
}
every_time
{ ----         ----
}
sleep_only
{ ----         ----
}
kill_only
{ ----         ----
}
die_only
{ ----         ----
}
```

FIG. 13

|  | MEMBER VARIABLES | METHOD |
|---|---|---|
| LEVEL-1 ACTOR | ACTOR STRUCTURE | LEVEL-1 SCRIPT |
| LEVEL-2 ACTOR | ACTOR STRUCTURE AND ACTOR VARIABES | LEVEL-2 SCRIPT |

IMAGE GENERATION DEVICE AND INFORMATION STORAGE MEDIUM

TECHNICAL FIELD

This invention relates to an image generation device and an information storage medium.

BACKGROUND ART

In game machines and computer graphics, a virtual world configured of a plurality of display objects or the like is constructed with the intention of generating an image that is highly realistic, by creating a field-of-view image within that virtual world.

However, in image generation techniques up to the present, the movements and other actions of display objects in a virtual world must be under the direct control of an application program, increasing the load on the author of the application program, and thus making it extremely difficult to construct a large-scale virtual world that has the complications of a real world.

Taking a three-dimensional game machine as an example, the application program has to provide all control, such as that over the three-dimensional coordinates of display objects disposed within the virtual world, which imposes restrictions on the number of display objects that can be disposed in the virtual world and the complexity of their movements and interactions. This is insufficient for implementing a virtual reality.

For that reason, the world is waiting for the appearance of software for constructing and manipulating a virtual world, inserted between the low-level program (OS) secreted within the hardware, or a graphics library, and the application program. In this case, the software is preferably highly generic, which does not need to be provided for each application program. In other words, it is preferable that a world constructed on this software and the structural components thereof maintain compatibility, even between different application programs. It is also preferable that this software is capable of assimilating any hardware differences, even if it is ported to other platforms (systems).

SUMMARY OF THE INVENTION

This invention was devised in the light of the above technical problems and has as an objective thereof the provision of an image generation device and information storage medium that can simplify the construction of a virtual world for image generation.

In order to solve the above described problems, there is provided an image generation device comprising: actor management means for managing at least one of the generation, activation, execution per unit time, sleep, halt, restart and termination of an actor which is an instance of a class and is also a process that can be executed in parallel; and means for generating an image including a plurality of display objects, each represented by the actor.

This invention makes it possible for the actor management means to manage the generation, activation, execution per unit time, and the like of an actor that has both of the characteristic of multi-processing and characteristic of an instance of a class. It also enables the generation of an image that comprises display objects represented by actors. Since this invention makes it possible for the actor management means to manage the execution per unit time (for example, every frame or every field) of actors, simply launching actors into a virtual world causes them to start to move around and perform their given roles. Since actors also have the characteristic of multi-processes, a plurality of actors can be operated in parallel within the virtual world and each actor can perform the task it is responsible for. This makes it possible to simplify the construction of a virtual world in which a large number of display objects appear. With this invention, each actor also has the characteristic of an instance of a class. Therefore, encapsulation and inheritance can be utilized to simplify the design of actors. Furthermore, actors are highly independent, so that an actor designed for one application program can be used in other application programs. This restricts any further increase in load on the programmer to a minimum, even when constructing a large-scale virtual world in which a large number of actors appear.

At least one of an actor for representing a display object, an actor for sound control, an actor for interface, an actor for actor-to-actor communications, and an actor for storage management may be provided. An actor of this invention can not only perform the task of representing a display object, it can also be assigned a variety of other tasks.

The actor for sound control may perform sound control based on disposition information from the actor for representing a display object. When the position of a display object is at a specific location, for example, a sound that is appropriate for that specific location can be generated based on the disposition information of the display object, thus increasing the realism of the generated sounds.

For each actor that is generated, actor information may be provided. This actor information can include at least one of: information for indicating whether an actor is enabled or disabled; information for indicating whether display of a display object represented by an actor is enabled or disabled; information for indicating whether a time count of an actor is enabled or disabled; information for indicating whether a time count loop is enabled or disabled; information for identifying a self actor; information for identifying a parent actor; information for identifying a child actor; information for identifying a method for an actor; information for identifying a model of a display object represented by an actor; disposition information for a display object represented by an actor; actor-related time information; information for identifying an actor that causes an action with respect to the self actor and the type of the action; information relating to communications between actors; and information for identifying a storage region in which an actor's variable is stored. By providing a variety of actor information for each actor in this manner, it is possible to increase the independence and manipulation capabilities of each actor unit, simplify actor management, and further increase the realism and amount of variety of the virtual world implemented by these actors.

As the information for identifying actors, a plurality of types of specification information may be provided. For example, by providing real specification information and virtual specification information, it is possible to make other actors believe that an action, actually done by a self actor, was done by a different actor. By providing specification information of a parent actor for a first hierarchical structure and other specification information of that parent actor for a second hierarchical-structure, it is possible to simplify the control or description of a display object having joints, for example.

The information for identifying a method for an actor may include at least one of information for identifying a script for describing a method of an actor and information for identifying from a plurality of methods a method to be executed every unit time. It is possible to facilitate the design of an actor by the application programmer by providing a script for describing the method of an actor, for example. It is also possible to increase the amount of variety in methods executed every unit time, by selecting the method to be executed every unit time from a plurality of method.

The actor-related time information may include at least one of time information relating to elapsed time from when a time count of an actor was enabled, time information relating to total elapsed time on condition that a time count loop is enabled, and time information relating to the sleeping of an actor. It is possible to give each actor a personal time axis by providing them with elapsed time information starting from when a time count became valid, for example. In addition, by providing each actor with total elapsed time information when a time count loop is enabled and time information relating to the sleeping of the actor, a variety of processes can be executed on the basis of such time information when the time count loop is enabled or when the actor sleeps.

The actor information may be stored as a structure type in a given storage region at actor generation, and actor management may be performed on the basis of this stored actor information. Actor management can be implemented by using actor information stored in a structure type, which simplifies and accelerates the actor management.

A self actor and other actors may access the actor information. This makes it possible to increase the amount of variety of the created virtual world by, for example, allowing actors to overwrite the specification information or disposition information of other actors.

The combination of the information for identifying a method for an actor, the information for identifying a model of a display object represented by an actor, and the disposition information for a display object represented by an actor may be changeable in real time. With such a configuration, operation could be in accordance with a first method and first disposition information during a first time period and in accordance with a second method and second disposition information during a second time period, by way of example. This makes it possible to implement a virtual world that is full of variety, even with a small number of models and methods, by combining them dynamically.

An actor may use the information for identifying actors to perform at least one of self-duplication and self-destruction. Self-duplication of actors makes it possible to simulate the division of microbes, for example. Self-destruction of actors makes it possible for an actor that has completed the task given to it to self-destruct on its own decision, without waiting for an instruction from the outside, thus reducing the processing load when seen from the viewpoint of the entire processing system.

As a predefined actor method, at least one of: a method executed when an actor is generated; a method executed when an actor is activated; a method executed every unit time; a method executed when an actor is asleep; a method executed when an actor is halted; a method executed when an actor is restarted; a method executed when an actor is forcibly terminated; and a method executed at the natural termination at the end of the lifetime of an actor may be provided. This provision of a method to be executed every unit time as a predefined method makes it possible for a generated actor to move by itself without being controlled by a parent actor, for example, as far as the generated actor is managed by the actor management means. This enables an actor having a class structure to operate as a multi-process.

A first script for describing a method of motion of a display object represented by an actor and a second script for describing an actor variable and a method may be provided. This provision of first and second scripts with different levels makes it possible to simplify control for each motion display or other processing, within the application program.

A member variable for each of first actors may be represented by a member of a structure that is unique to each of the first actors, and also a method of each of the first actors may be represented by the first script. A member variable for each of second actors may be represented by a member of a structure that is unique to each of the second actors and by the second script, and also a method of each of the second actors may be represented by the second script. In an object-orientated system, member variables and methods are integrated, but in this invention, a member variable for first actors can be represented by a member of a structure that is unique to (or provided for) each of the first actors, and a member variable for second actors can be represented by a member of a structure that is unique to each of the second actors and also by the second script.

An execution code for a method used in common by a plurality of actors executed in parallel as processes may be stored in a common storage region. With ordinary multiprocessing, even when a plurality of processes executed in parallel are based on the same program, the execution code for each process is stored in a different storage region. In contrast thereto, this invention takes execution code for a method used by a plurality of actors and stores it in a common storage region, making it possible to save on the storage capacity required therefor.

A storage region necessary for the execution of an actor may be reserved at actor generation, and the thus-reserved storage region may be released at actor termination. With this configuration, storage regions corresponding to the number of generated actors can be reserved, making it possible to save on the storage capacity required therefor. This also reduces the load on the programmer, making it possible to reduce errors relating to memory management.

The execution of methods of actors may be switched in sequence from top to bottom of a hierarchical structure of actors, during execution at every unit time for actors. With this configuration, it is possible to allow the influence of a parent actor to affect a child actor within the same unit time, for example, thus making actor management more suitable.

The actor management means may be a library that is linked to an execution module of an application program. With this configuration, a variety of actor management services can be accessed by simply linking the created application program to the actor management means, which is a library.

The actor management means may have means for executing the same script, in which is described a method of an actor, on different hardware resources. With this configuration, a script created for a first machine can be used on a second machine, making it possible to ensure compatibility irrespective of development machine, group of tools, or execution environment, and enabling efficient utilization of existing resources.

An actor for enabling an operator to interactively control at least one of the generation, activation, execution per unit time, sleep, halt, restart, and termination of an actor, and the disposition information may be provided. With this configuration, an operator can interactively utilize actor management services provided by the actor management means, facilitating the development of application programs.

BRIEF DESCRIPTION OF DRAWINGS

FIG. 3 shows examples of a variety of actors.

FIG. 6A to FIG. 6I illustrate rules applied to characters.

FIG. 7 illustrates an actor structure.

FIGS. 8A, 8B, and 8C illustrate the concept of time information for actors.

FIGS. 12A and 12B illustrate a level-1 script and a level-2 script.

FIG. 13 is a table illustrating member variables and methods of actors.

BEST MODE FOR CARRYING OUT THE INVENTION

A preferred embodiment of this invention is described in detail below, with reference to the accompanying drawings.

Figure 1:
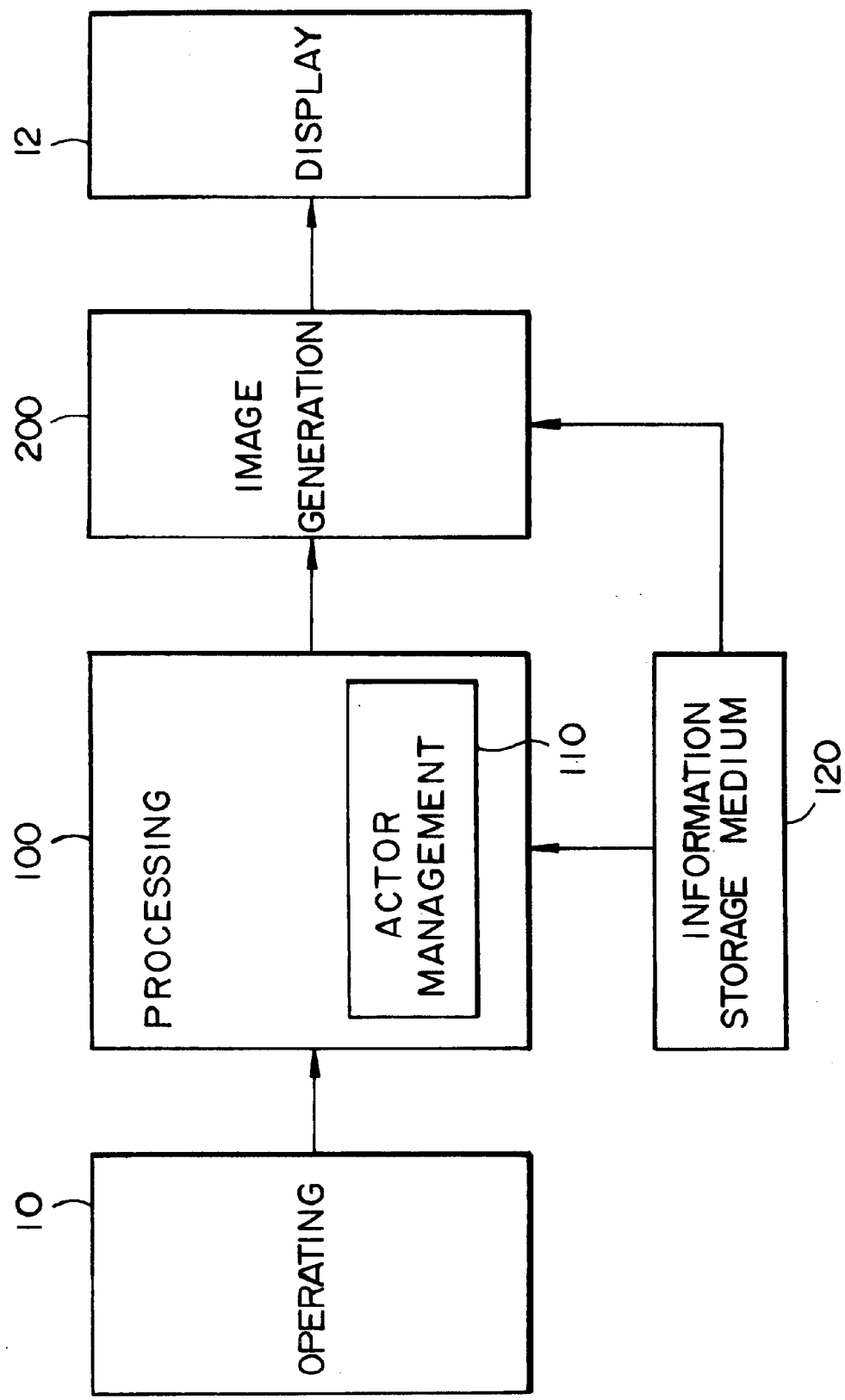
FIG. 1 shows an example of a functional block diagram of an embodiment of this invention.

A functional block diagram of an image generation device in accordance with this embodiment is shown in FIG. 1. This image generation device is one that is used in a game machine, simulator, a development tool for generating game images, computer-graphic (CG) images, or the like.

An operating portion 10 receives manipulation information, and is equivalent to a joystick, buttons, steering wheel, accelerator, keyboard, mouse, or the like. A processing section 100 performs various processing such as the execution of a program, based on factors such as manipulation information obtained from the operating portion 10 and a given program, and it is configured of hardware such as a CPU and memory. An image generation section 200 generates images based on the processing results of the processing section 100, and it is configured of hardware such as a CPU, a dedicated image generation IC, a DSP, and memory. Images generated by the image generation section 200 are displayed in a display section 12.

The processing section 100 comprises an actor management section 110. The actor management section 110 manages the generation, activation, execution per unit time, sleep, halt, restart and termination of an actor which is a process that can be executed in parallel and is also an instance of a class. The image generation section 200 generates images comprising a plurality of display objects, each represented by one of these actors. During this time, information such as information for managing an actor at its generation, or the like, and information for generating an image comprising a display object represented by an actor is stored in an information storage medium 120. The actor management section 110 functions on the basis of this stored information. Apart from program code, various items of information could be included in this stored information, such as image information, sound information, shape information for display objects, table data, and list data various types could be used as this information storage medium 120, including memory such as ROM or RAM, a CD-ROM, a game cassette, an IC card, DVD, magneto-optical disks, or floppy disks.

The description now turns to the concept of an actor of this embodiment.

1. Concept of "Actor"

An actor in this embodiment of the invention is a process that can be executed in parallel and is also an instance of a class. In other words, it is an instance of a class (or rather, an object) that has been turned into a process. This means that an actor of this embodiment differs from a conventional actor having no class structure (see, for example, *Obujekuto-Shiko No Subete* (*All about Object Orientation*), an extra issue of *Interface*, Pages 154–155.

With the conventional actor, if an actor receives a message which requests the actor to perform a process, the actor is not forced to inform the result of the process, and the message exchange is mono-directional. In this point, the conventional actor differs from an object in an object orientated system (object oriented programming) which can force another object to reply so that message exchange is bidirectional. In other words, the conventional actor is a completely independent individual. Between conventional actors, there is not a relationship similar to the relationship between a class and its instance, and also there is not an interaction caused by the mutual message transmission. In contrast thereto, between actors of this embodiment, there is a relationship similar to the relationship between a class and its instance, and they can be immediately executed and forced to reply to a message, like objects (or instances) in an object-oriented system, in addition to having the characteristic of message transmission similar to that of the conventional actors.

An object in an object orientated system operates in a single process and cannot operate in parallel. In other words, it does not have the property of a process that can be executed in parallel. Therefore, an actor in accordance with this embodiment differs from an object in an object orientated system.

This embodiment of the invention introduces a new concept of "actor" that is provided with both the properties of an object in an object orientated system and the properties of the conventional actor, and this actor can be used to create application software.

Figure 2:
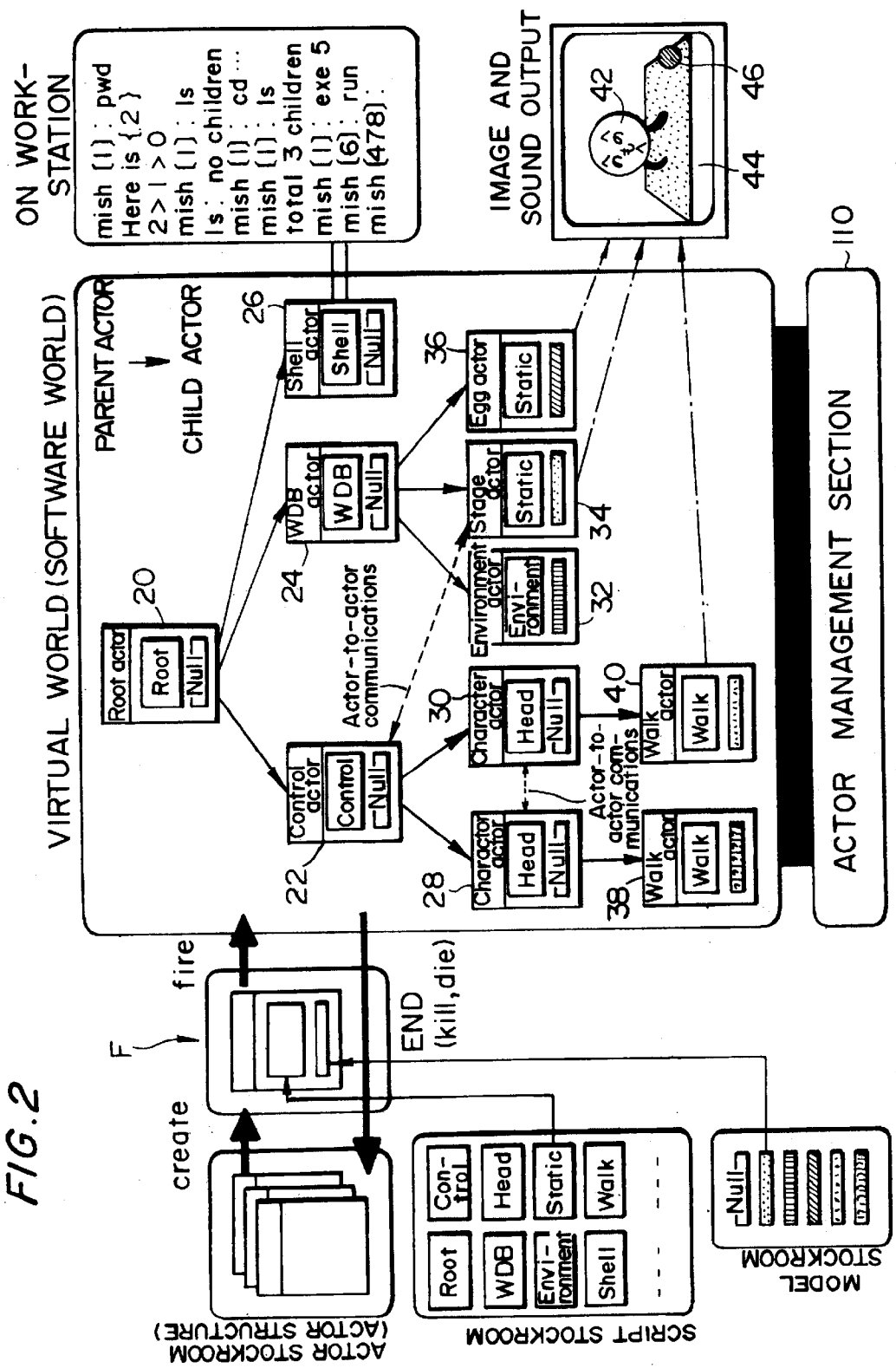
FIG. 2 illustrates the concept of "actor" in this embodiment.

Images of these actors operating in parallel under the actor management section 110 are shown schematically in FIG. 2. FIG. 2 shows what happens when a plurality of actors of this embodiment, moving around simultaneously and in parallel like living creatures within a virtual world.

The user uses computer graphics (CG) tools to design the movements of each actor and a dedicated script to describe the meaning and details of that actor's behavior. If the thus-created actors are simply put (fired) into the virtual world, these actors will then start to move around autonomously. If necessary, these actors perform actor-to-actor communications with other actors. An actor that is no longer needed is killed off by specifying the ID (specification information) of that actor. If that happens, the actor itself performs any necessary post-processing, then disappears from the virtual world. With this embodiment, other actors can be used to automatically perform various operations with respect to the thus-configured actors (such as launching an actor into the virtual world or killing it off), so that a virtual world can be constructed on the basis of the laws of cause and effect, making it possible to seem like the real world.

Since an actor in this embodiment of the invention also has the properties of an object in an object orientated system, the actors themselves can use inheritance to design further actors, enabling comparatively simple modeling of phenomena in the real world.

The various entities listed in FIG. 3 can be considered as actors in this embodiment. A display actor represents a static body, a moving body, or the like. A sound control actor controls games sounds or the like, so that it generates the sound that ought to be heard at the position of a vehicle, by way of example, based on position information from a display actor that represents that vehicle. An interface actor provides an interface between the user and the system or an interface with another system board. Manipulation information from a game controller or keyboard, for example, is transferred through a user interface actor. When an actor transfers data to another system board, it is sufficient to send the details of the data to be transferred and any transfer instructions to a system board interface actor. In such a case, the system board interface actor transfers the data to the other system board while controlling details such as transfer timing, then returns a report thereon to the actor that requested the transfer. The role of a storage management actor is to secure and release storage regions for storing an actor structure (a structure allocated to each actor), actor variables, or the like. If necessary, it also performs "Garbage Collection". A physical calculation actor is responsible for physical calculations relating to movements of display objects and also physical calculations relating to generated sounds. A search/sort actor is responsible for searching for and sorting data, and a database actor forms a database of display objects and the like for the virtual world. A management/organization actor manages and organizes the movements of a plurality of display actors, for example, or manages and organizes the entire system. In the thus-configured embodiment, tasks to be performed in the virtual world are distributed between appropriate actors. If necessary, the actors can communicate autonomously and can make new actors autonomously, so that all tasks (that is, all the tasks of a game program, if this is a game) can proceed. It goes without saying that a plurality of actors can be made responsible for the same task. To summarize, the actors can be considered to be specialists who each perform tasks in their own specialist fields.

If an actor finds that a task is too much for it to handle by itself, or if there is a more suitably qualified agent available, it can delegate the task to another actor that specializes in that field. In the conventional object orientated system, inheritance can be considered to be delegation in a broad sense, but this embodiment covers both delegation in a narrow sense and inheritance, so they can be properly used to suit the objective. Assume, for example, that a character actor 28 in FIG. 2, which is responsible for the head of a character 42 on screen, sends a message relating to control of the environment in the virtual world to a parent control actor 22. When that happens, the control actor 22, which is responsible for overall control of that character but is not itself a specialist in the task within that message, delegates that task to a world database (WDB) actor 24, and the WDB actor 24 then delegates that task to an environment actor 32 which is responsible for environment control.

The actors of this embodiment are provided with both characteristics as objects and characteristics as processes (the conventional actors), as described below.

(1) Characteristics as Objects
  (a) Member variables (data) and method (procedure) are integrated (encapsulated).
  (b) Method calls are enabled.
  (c) There's a high level of information concealment.
  (d) Inheritance is possible. Note that, multiple inheritance (the formation of a new class based on a plurality of classes) can be realized by combining a plurality of actors.

(2) Characteristics as Processes
  (a) Each actor has a high level of independence, and parallel processing is possible.
  (b) It is possible to specify an actor ID for performing various operations, such as extracting information held by that actor, or killing an actor that is no longer necessary.
  (c) Each actor has a parent actor (equivalent to a parent process) and child actors (equivalent to child processes), so that the overall configuration is that of a single giant tree structure.
  (d) If necessary, an actor can perform operations such as activating, halting, restarting, terminating, or pausing other actors. It can also destroy itself (suicide) or duplicate itself recursively. It should be noted, however, that if an actor activates or halts another actor, the actor management section 110 accepts and executes that action.

2. Operation of this Embodiment

The description now turns to the operation of this embodiment.

In the embodiment shown in FIG. 2, an actor stockroom, a script stockroom, and a model stockroom are set up. An entity of the actor stockroom is an actor structure, which will be described later. In other words, there are previously defined various data types for storing actor information in each member of the actor structure in this embodiment. Within the script stockroom is provided a plurality of types of script, such as a script for a root actor and a script for a control actor, that describe the meaning and details of the behavior of each actor. As will be described later, these scripts are low-order level-1 scripts that describe the motion of an actor (key frames, interpolation method, parent-child relationships, etc.) and high-order level-2 scripts that can describe both variables and the method of an actor. The model stockroom is a stockroom for model groups used in actors, wherein the entities thereof in this embodiment are model group files. Such a model group file specifies the relationship between the ID of a polygon object within a level-1 script and an ID within the system board, for example. The author of an application program mainly creates these scripts and model group files.

When an actor is created, a script and model corresponding to that actor are referenced from the script stockroom and model stockroom, respectively, as shown at F in FIG. 2. More specifically, there is a script ID and model group ID among the members of each actor structure, as will be described later. When an actor is created, the actor management section 110 writes the script ID and model group ID for that actor into the actor structure. When this actor is fired (activated) after being created, that actor is put into the virtual world. More specifically, a complete actor is formed when an actor is created, but flags indicating activation and execution are off. Firing the actor turns these flags on, so that it is handled as an object of activation and execution within the virtual world.

Ordinarily, a root actor 20 shown in FIG. 2 creates and fires (activates) the control actor 22, the world database (WDB) actor. 24, and a shell actor 26 that are its children. More accurately, the root actor 20 directs the creation and firing of each child actor, and the actor management section 110 accepts that direction and executes it. The control actor 22 then creates and fires character actors 28 and 30 that are its children, and these character actors 28 and 30 create and fire walk actors 38 and 40. The WDB actor 24 creates and fires the environment actor 32, a stage actor 34, and an egg actor 36 that are its children. In this manner, a plurality of actors 20 to 40 are placed in a state in which they can be executed in parallel, and thus the virtual world is configured.

The root actor 20 has the role of creating and activating the control actor 22, the WDB actor 24, and the shell actor 26, together with controlling the entire system, and it operates in accordance with the specifications of a root script. It should be noted, however, the model group information therefor is null. The control actor 22 has the role of controlling and organizing the character actors 28 and 30, and it operates in accordance with the specifications of a control script. The role of the WDB actor 24 is to control and organize the environment actor 32, the stage actor 34, and the egg actor 36. Finally, the role of the shell actor 26 is to control a shell on the system board or on a workstation connected to the system board. This shell enables the user to control interactively the creation, activation, execution per unit time, sleep, halt, restart, or termination of actors. Note that the model group information for each of the control actor 22, the WDB actor 24, and the shell actor 26 is also null.

The character actor 28 is responsible for the head of the character 42 on the screen and the character actor 30 is responsible for the head of another character, which is not shown in the figure. A head script used by the character actors 28 and 30 defines actions to be performed by the characters when they bump into a wall or discover an egg, for example. The role of the walk actors 38 and 40 is to define the walking motion (animation) of each character. A motion script (level-1) used by the walk actors 38 and 40 defines the motions of the torso and legs of each character.

The role of the environment actor 32 is to control details such as the color of the background, other than a stage 44, and the brightness of light sources. The roles of the stage actor 34 and the egg actor 36 are to display the stage 44 and an egg 46, respectively, which are static bodies.

Note that the model group information of each of the character actors 28 and 30 is null, but each of the environment actor 32, the stage actor 34, the egg actor 36, and the walk actors 38 and 40 have corresponding model group information.

Figure 4:
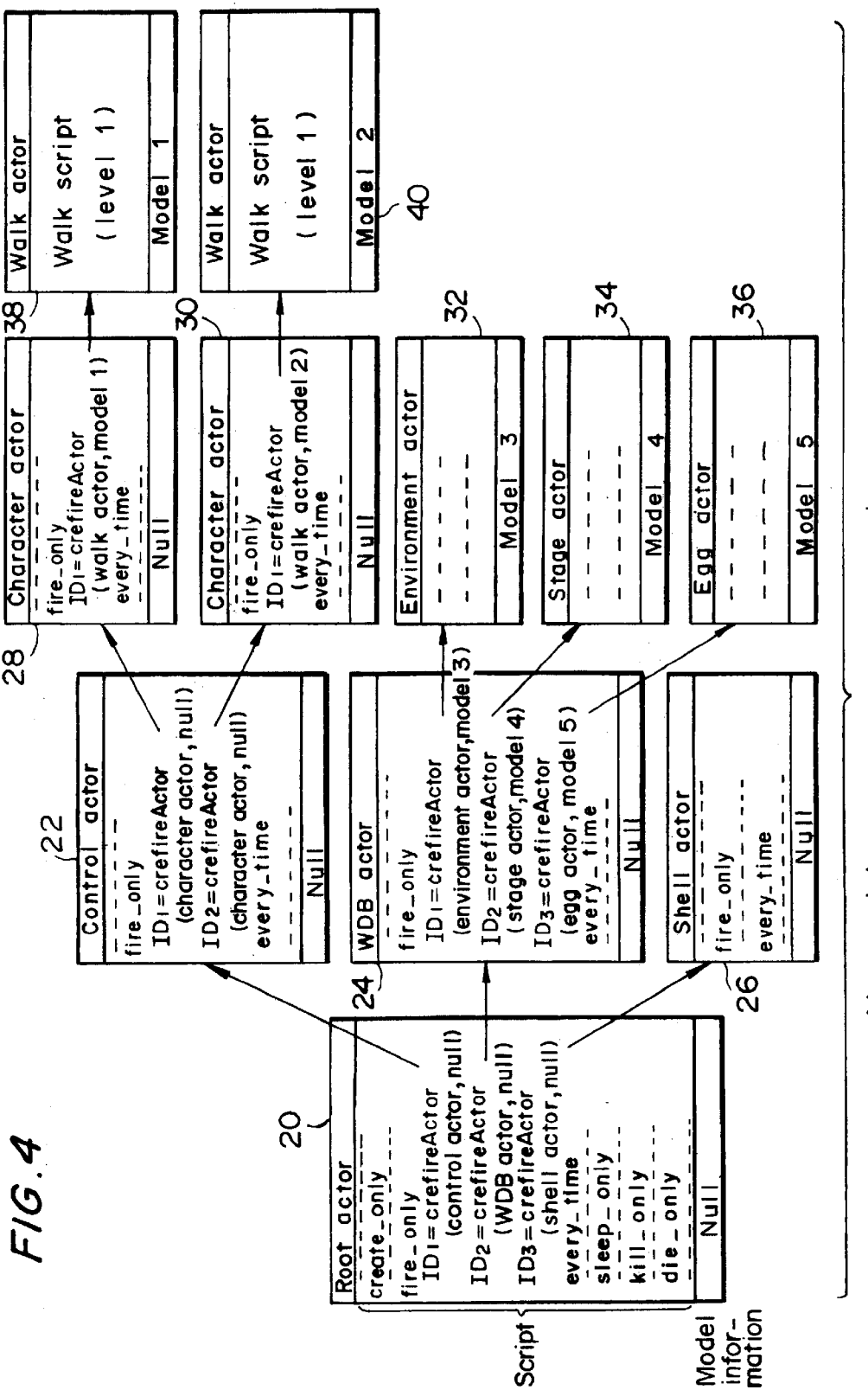
FIG. 4 illustrates the operation of this embodiment.

The operation of this embodiment will now be described in even more detail with reference to FIG. 4.

The script of the root actor 20 has parts such as create_only, fire_only, every_time, sleep_only, kill_only, and die_only, which are executed when the actor is created, when it is activated, when it is executed every unit time (for example, every one frame), when the actor sleeps, and when the actor terminates (is killed or dies), respectively. Therefore, when the root actor 20 is activated (fired), the method described in the fire_only part of the script of the root actor 20 is executed. In FIG. 4, the description in the fire_only part specifies the creation/activation of actors such as the control actor 22 and a WDB actor with null model group information, as in crefireActor (control actor, null) and crefireActor (WDB actor, null), so actors with null model group information are created or activated thereby. In practice, a specification of creation/activation by the root actor 20 is accepted by the actor management section 110, which is a library of a group of functions such as crefireActor (creation and activation), and it is executed by the actor management section 110.

Note that, when crefireActor is executed in this embodiment, the ID (specification information) of that actor is returned as a return value. In FIG. 4, the control actor 22, the WDB actor 24, and the shell actor 26 return values of ID1, ID2, and ID3, respectively. These values ID1 to ID3 can therefore be used thereafter to specify those actors. If, for example, the control actor 22 is to be killed, killActor (ID1) could be specified.

When the control actor 22 is activated, the fire_only part for the control actor 22 is executed at that point. Since there are descriptions for two crefireActor (character actor, null) commands at this point, the two character actors 28 and 30 are created and activated. These character actors 28 and 30 have different IDs, but the same script is used for them. In other words, they both have the same head. When the character actors 28 and 30 are activated, this time the walk actors 38 and 40 are created and activated in accordance with the descriptions in the fire only part of the script for the character actors 28 and 30. In this case, the walk actors 38 and 40 use a model 1 and a model 2, respectively, for display in accordance with the description in the model group information specification of crefireActor for the character actors 28 and 30. Since the walk actors 38 and 40 use the same walk script, the resultant motions (the motions of the torso, hands, and legs) are the same. In other words, actors with different model groups are activated, but the motions thereof are the same (except that details such as the replay speed and the phase of repeating motion can be set individually).

When the WDB actor 24 is activated, the environment actor 32, the stage actor 34, and the egg actor 36 are created and activated in accordance with the description of the fire_only part of the script for the WDB actor 24. In this case, the environment actor 32, the stage actor 34, and the egg actor 36 use model group 3, model group 4, and model group 5, respectively, for display in accordance with the description of the model group information specification portion of crefireActor for the WDB actor 24.

After the fire_only part has been executed as described above, the every_time part of each script is executed in each frame. The every_time part for the character actors 28 and 30 specifies the kinds of actions performed when a character bumps into a wall or finds an egg, for example. The every_time part for the control actor 22 contains descriptions for monitoring characteristics of each character, such as its position and age, and various kinds of processing to be performed in answer to the results of this monitoring.

When an actor is sleeping, on the other hand, the sleep_only part is executed instead of the every_time part. If, for example, the sleep_only part of the character actors 28 and 30 describes a change of model when that actor is asleep, the facial expression of the character when it is asleep can be changed to a sleeping expression or the like.

In the kill_only part, the method that is executed when that actor is killed (when it is forcibly terminated by another actor or by itself) is described.

In the die_only part, the method that is executed when that actor dies (when it terminates naturally at the end of its lifetime) is described.

These kill_only and die_only parts make each actor disappear after it has performed any necessary post-processing.

Note that when a parent actor terminates (is killed or dies) in this embodiment, the configuration is such that all of the actors below that actor (child actors, grandchild actors, great-grandchild actors, and so on) are killed off and thus are terminated. More specifically, at the termination of an actor, a kill_children function is executed, such that "when attention is drawn to a certain actor, if that certain actor terminates, kill all the children actors of that certain actor." When the children actors of the certain actor are terminated by killing, these children actors also execute this kill_children function. Thus any grandchild actors are also terminated by killing. In this manner, the tree structure is searched recursively to terminate all the actors below a specific actor.

In this embodiment, the management of the above-described generation, activation, execution per unit time, sleep, halt, restart, or termination of actors, is done by the actor management section 110. Since the actor management section 110 provides such management in this embodiment of the invention, actors having a class structure can be executed as processes in parallel. Since each actor independently executes the method described in the every_time part, for example, in accordance with various surrounding conditions, it is possible to construct a complicated, large-scale virtual world that is close to the real world, without increasing the load on the programmer that much.

In other words, the programmer need only design actors, then finally collect them together and simply put them into the virtual world (or, depending on the design, put them in sequence). Since the actors are highly independent, this embodiment also has the characteristic of enabling a plurality of programmers to divide and organize the work between them smoothly.

3. Example of Generated Images

The description now turns to an example of the images generated by this embodiment of the invention.

Figure 5A:
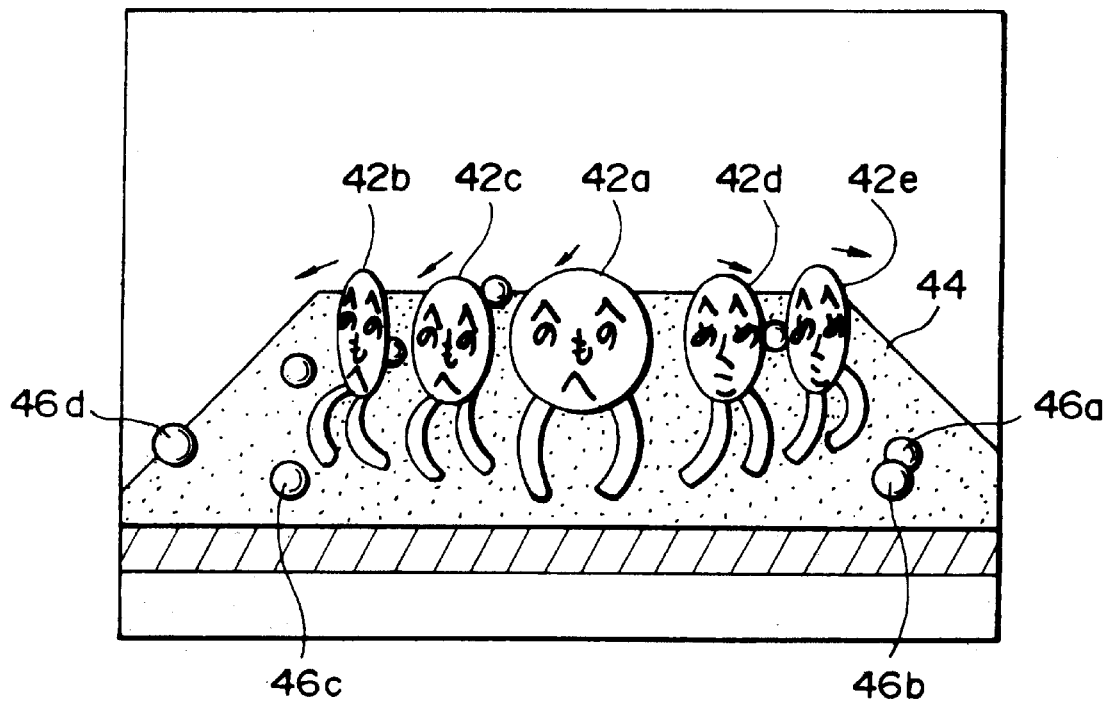
FIGS. 5A and 5B show examples of images generated by this embodiment.

As shown in the generated image of FIG. 5A, at the start of the program, eggs 46a to 46d and other items are disposed at random on the stage 44, and characters 42a to 42e are moving around so as to find and pick up those eggs.

During this time, the movement of each character is governed by a first rule illustrated in FIGS. 6A to 6C, a second rule illustrated in FIGS. 6D to 6F, and a third rule illustrated in FIGS. 6G to 6I. These rules are specified in the head script for each of the character actors 28 and 30 of FIG. 2.

The first rule is as follows: if the character 42 comes to the edge of the stage 44, as shown in FIG. 6A, it rotates at that place as shown in FIG. 6B, rebounds at an angle of reflection that is specified by the angle of incidence, then once again proceeds, as shown in FIG. 6C.

The second rule is as follows: if the character 42 finds an egg 46 when in a state in which it does not have an egg on its head, as shown in FIG. 6D, the egg 46 is placed on its head, as shown in FIG. 6E, and it continues walking with the egg 46 still placed upon its head,.as shown in FIG. 6F.

The third rule is as follows: if the character 42 finds another egg 46b when in a state in which the egg 46a is already on its head, as shown in FIG. 6G, it places the egg 46a that it already has at that location, as shown in FIG. 6H, and it continues walking as shown in FIG. 6I. Note that other eggs are ignored if discovered within a certain time after an egg is picked up or deposited.

Figure 5B:
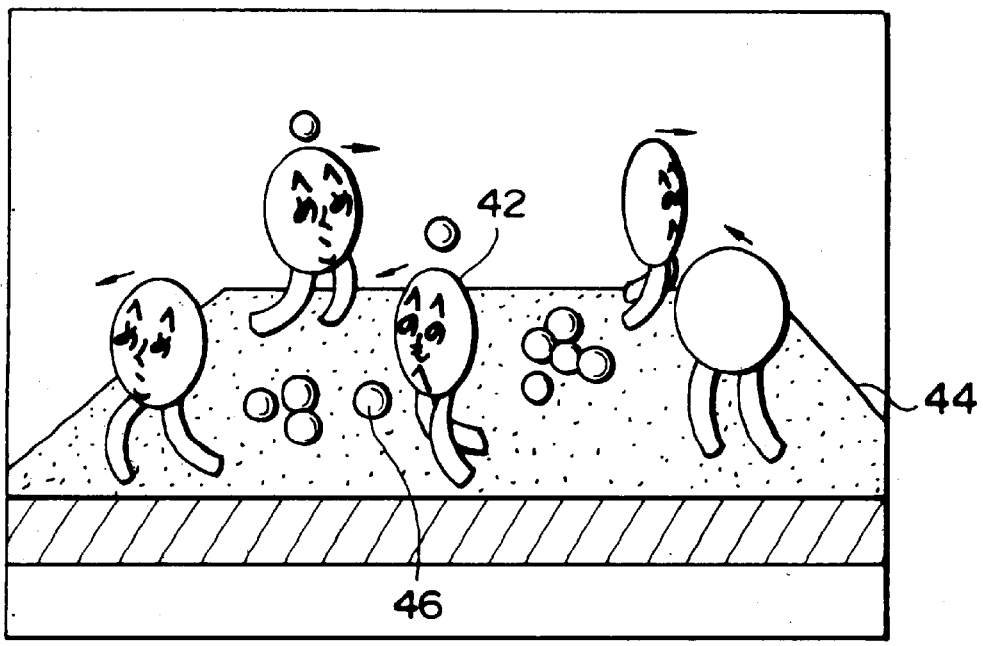

After a certain time elapses with the characters operating in accordance with these rules, the eggs will have collected at a number of locations on the stage 44, as shown in FIG. 5B.

In this embodiment, all of the characters 42a to 42e use the same head script (first to third rules: 28 and 30 in FIG. 2) to operate. Walk actors that determine the movements of the torso and legs of each of the characters 42a to 42e (38 and 40, in FIG. 2) use the same walk script. Therefore, the characters 42a to 42e all have the same head and the torsos and legs thereof operated by the same movement pattern. On the other hand, the characters 42a to 42c use a different model from the characters 42d and 42e, so their appearances seem to differ. In addition, the positions of the game characters 42a to 42e in their initial state are all different.

With this embodiment, the programmer can write just one head script and one walk script for characters, to configure a complicated, large-scale virtual world in which a large number of the same type of characters can appear, as shown in FIGS. 5A and 5B. In other words, it is possible to create a highly realistic virtual world without increasing the load on the programmer too much. Note that it is also possible to make not all of the head scripts for the characters the same, so that the head script of the character 42a alone could be slightly different from the others, by way of example. In such a case, the author need only write a program for the difference. Furthermore, it is also possible to run two head scripts having completely different functions for two different actors, implement a function such as actor-to-actor communications between those two actors (or between them and a higher-level actor that manages them), and combine those functions to create the appearance of multiple inheritance and thus form a new head script.

In practice, a library function (part_of_Actor) is utilized for executing only a specific part (such as every_time) of a certain level-2 script. In other words, part_of_Actor (base class, every_time) could be described within its own (derived class) every_time part, and only the differences from the base class need be specified before-and after part_of_Actor. Since an actor is only permitted to have single inheritance, "member variables of derived class" can be obtained by simply adding "differential member variables" to "member variables of base class". Therefore, smart inheritance with no conflicts can be implemented.

4. Actor Structure

The description now turns to the members of an actor structure of this embodiment of the invention. An actor structure is a structure that is allocated to each actor; this forms the nucleus of this embodiment.

An example of the members of an actor structure in accordance with this embodiment is shown in FIG. 7.

An actor flag indicates whether this actor is enabled or disabled. The actor flag is turned on when the actor is created and turned off when the actor terminates (is killed or dies).

A display flag indicates whether the display of a display object represented by the actor is enabled or disabled. When this display flag is turned on, the display object represented by that actor is made to appear on the screen.

A time count flag indicates whether a time count for the actor is enabled or disabled. In this embodiment, each actor has its own characteristic time axis and can change its time-elapse speed. When the time count flag is turned on, time proceeds for that actor; when it is turned off, time stops. For example, if the time count flag of actor 1 is turned on at a time t1 in the virtual world, time proceeds for that actor 1 from the start point of t1. In other words, the time start point for actor 1 can be made to differ from the time start point of the virtual world. If the lifetime of actor 1 is set to 100 frames, actor 1 disappears at a time t4 which is equal to t1 plus 100 frames. In a similar manner, if the time count flags for actors 2 and 3 are turned on at a time t2, time proceeds for actors 2 and 3 from the start point of t2. Actor 2 disappears at a time t2 which is equal to t2 plus 100 frames. On the other hand, actor 3 has a time-elapse speed that is twice that of actors 1 and 2. This can be implemented by adding a description that doubles the time-elapse speed to the every_time part of the script for actor 3. Since actor 3 has a doubled time-elapse speed, it disappears at a time t3 which is equal to t2 plus 50 frames, even though the lifetime set therefor is 100 frames.

Another implementation method that could be considered, different from the above, is to maintain time to be added every frame as a floating-point variable, instead of having simple "flags." For example, instructions could be set such that "if 0, then do not increment," "if 1, then time proceeds at the rate of one frame per frame," and "if 2.5, then time proceeds at 2,5 frames per frame."

The effects described below can be achieved by controlling time-elapse speeds independently for each actor. In real-time image generation, the processing load often becomes so heavy that problems such as frame dropout occur. If, for example, the time-elapse speed of the leg portions alone of a character is increased in such a case, it is possible to generate an image that does not result in contradictions, even if such frame dropout occurs.

A loop flag indicates whether a time count loop is enabled or disabled. Assume, by way of example, that the lifetime of an actor is 100 frames. If the loop flag is off in such a case, the actor disappears after its lifetime of 100 frames, as shown in FIG. 8B. If the loop flag is on, on the other hand, time for that actor is reset every 100 frames, enabling a lifetime for that actor that is actually infinitely large. Turning the loop flag on makes it possible for a display object represented by that actor to move for an infinite period, even when only motions for 100 frames are described in the level-1 script (this is useful for repeating animation, such as that of a human walking). This makes it possible to simplify the script descriptions.

Figure 9A:
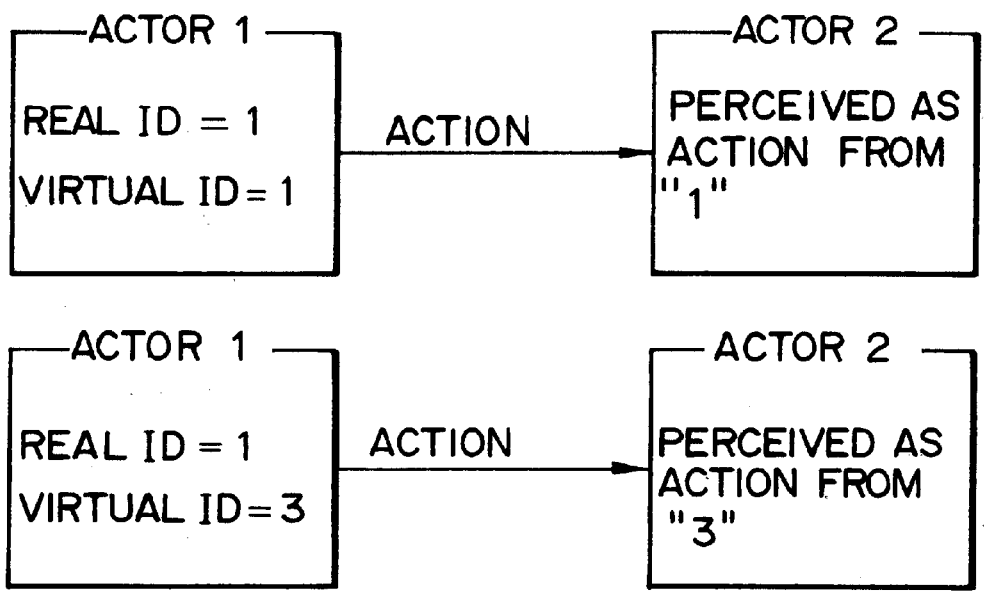
FIG. 9A illustrates the real ID and virtual ID of an actor.

The real ID of an actor is information for identifying that actor. This real ID is determined when the actor is created. It is written into the actor structure by the actor management section 110 and is basically unmodifiable. The virtual ID of an actor, on the other hand, is the same as the real ID by default, but it can be modified. Making the virtual ID different from the real ID makes it possible for an actor to perform various actions under other actors' names. If actor 1 performs an action on actor 2 with a virtual ID that differs from its real ID, as shown in FIG. 9A, actor 2 recognizes that action as being performed by a different actor as specified by the virtual ID. In addition, if actor 1 makes its own virtual ID the same as the ID of actor 4 before it creates an actor 3 as a child of itself, actor 3 will be created as a child of actor 4, not of actor 1. Virtual IDs can also be used to implement a single actor that acts as an agent for processing to be done by a plurality of actors. If, for example, a plurality of actors have to do some common processing, a processing agent actor performs the processing sequentially while modifying its own virtual ID in sequence to the IDs of a plurality of actors. This makes it possible to appear as if that plurality of actors themselves have done the processing, making the description in the script more compact. If it is desirable to utilize a privilege that is permitted only to the root actor, the self virtual ID could be modified to the ID of the root actor, just to utilize that privilege.

The real ID of the parent actor is information for identifying the parent actor of a child actor. A real ID of the parent actor for geometrical calculation is another information for identifying the parent actor for geometrical calculation. Ordinarily, an actor that has created a child actor in this embodiment is the parent of that child actor. However, a programmer might want to utilize a hierarchical structure for geometrical calculation that differs from the normal parent-child structure. Assume, for example, that there is a display object with a structure in which first and second polygon objects are connected by a joint. In such a case, it is preferable to set the origin for the coordinates of the second polygon object on the basis of the coordinates of the first polygon object. In such a case, the parent for geometrical calculation of the second polygon object is made to be the first polygon object.

In the thus-configured embodiment, it is possible to achieve a variety of effects by providing several types of actor identification information (real ID, virtual ID, and ID for geometrical calculation.

The script ID and model group ID are information for identifying the currently-used script and model. In the thus configured embodiment, the currently-used script ID and model group ID can be freely modified for each actor in real time, making it possible to greatly increase the variety of images obtained thereby.

Figure 9B:
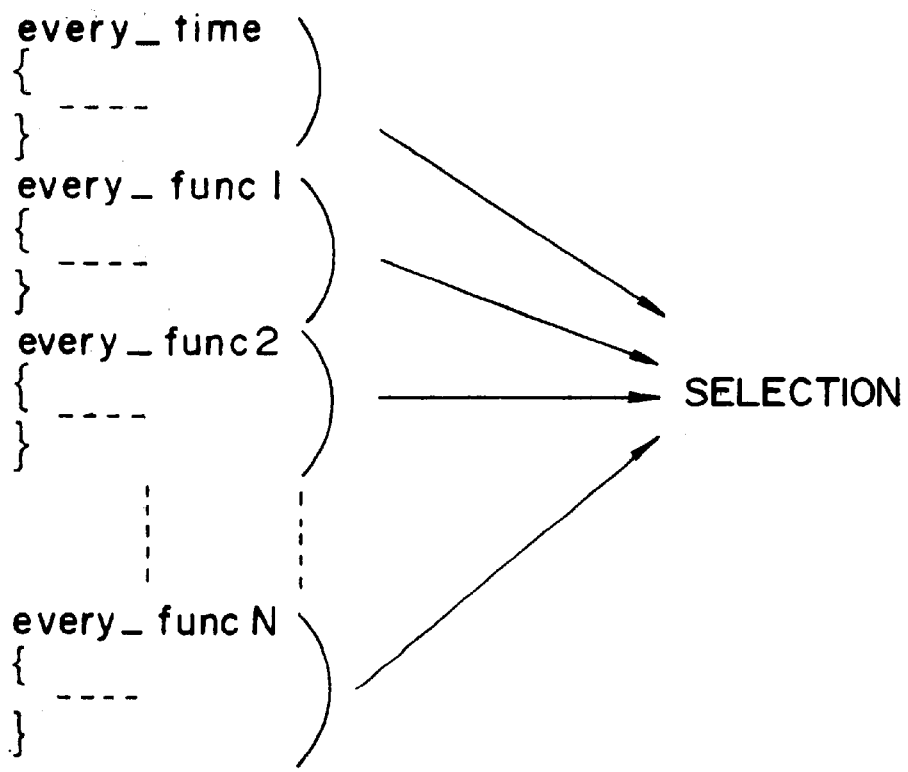
FIG. 9B illustrates the selection of user-defined every_time parts.

The every_func pointer is information for identifying which of several user-defined functions, each called every_func, is to be executed next by the every_time part. In other words, this embodiment makes it possible to select the execution of any of every_func1 to every_funcN, which is to be substituted into the predefined method every_time, as shown in FIG. 9B. This makes it possible to avoid the restriction that all of the actor's actions have to be described within the every_time part, thus reducing the load on the programmer. Moreover, external actors can easily switch processing details to be executed by the self actor in each frame. This further increases variety of expression. Note that it is also possible to implement more complicated methods by calling a plurality of every_func modules directly and combining them in various ways as necessary.

The lifetime represents the lifetime of the actor. The elapsed time and total elapsed time are the elapsed time from when the time count flag is turned on. Note that the total elapsed time expresses the total of time that has elapsed, and the counting operation of the total elapsed time is not reset even if the loop flag is on. The time until wake-up represents the time remaining until a sleeping actor wakes. This provision of actor-related time information as members of the actor structure makes it possible to give each actor an independent time axis, and also enables repeating animation.

Disposition information for an actor represents position information (position vectors) and direction information (a rotational matrix) for the actor in the world coordinate system. The walk actors 38 and 40 of FIG. 2 are set up to perform a variety of motions described in a level-1 script that has this disposition information as an origin. For example, it is possible to provide a plurality of actors having the same head script and the same walk script, and a large-scale virtual world that appears to be complicated can be constructed by changing only the disposition information of each of these actors.

Child actor-related information specifies details such as the start position, end position, and total number of child actors in a storage region.

The virtual ID and type of action of an actor that has caused an action is information for identifying the actor that last caused an action and the type of that action, for example. This information is useful when debugging a program, for example. It is also useful in cases such as when an attack from an unknown actor is received, to attempt a retaliation on that actor.

The actor communications information is used for determining that a message or the like has been sent to the self actor, and is represented by a structure. It is possible to know the number of messages addressed to the self actor, for example, by referencing this information.

The actor variable storage region information is information for identifying a storage region for an actor variable declared by a level-2 script, and in this embodiment it is represented by a structure. The storage region for an actor variable declared by a level-2 script is reserved at actor creation and released at actor termination.

In the thus-configured embodiment of this invention, various items of information (hereinafter referred to as "actor information") are stored as members of an actor structure, as shown in FIG. 7. In an object orientated system, member variables and methods are integrated, and in this embodiment, the items that correspond to these member variables in the object oriented system are actor variables declared in a level-2 script and actor information stored in an actor structure. Whereas an actor variable is defined by the author of an application program, actor information stored in an actor structure is previously determined variables that are highly generic from the system point of view. The storage of this actor information in an actor structure is done by the actor management section 110 at actor creation, for example. The actor management section 110 performs its actor management on the basis of this actor information.

In this embodiment, the actor information can be accessed by both the self actor and other actors. A variety of effects can be achieved by, for example, allowing actors to access and overwrite details such as the virtual ID, lifetime, and disposition information of another actor.

Figure 10A:
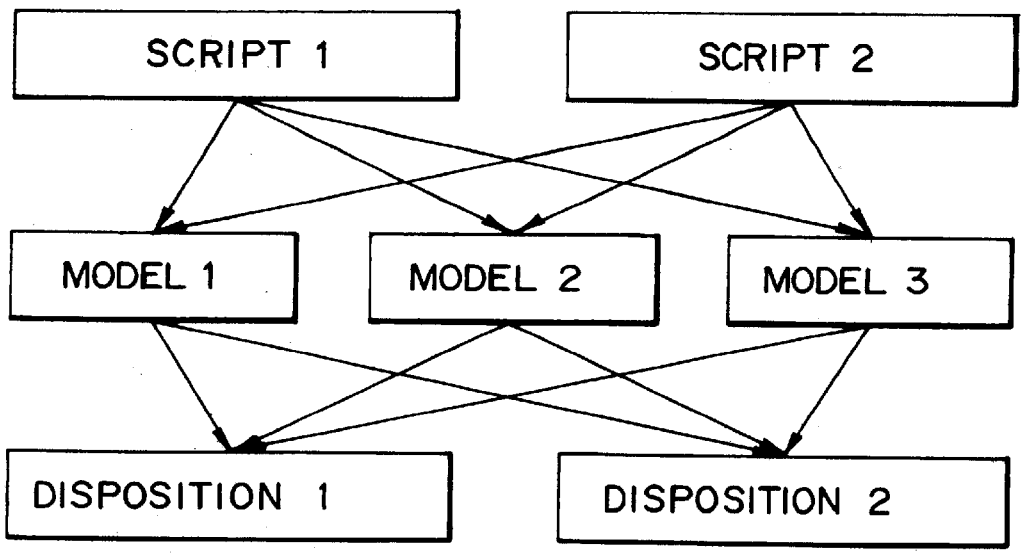
FIGS. 10A and 10B illustrate the concept of combining scripts, models, and dispositions.
Figure 10B:
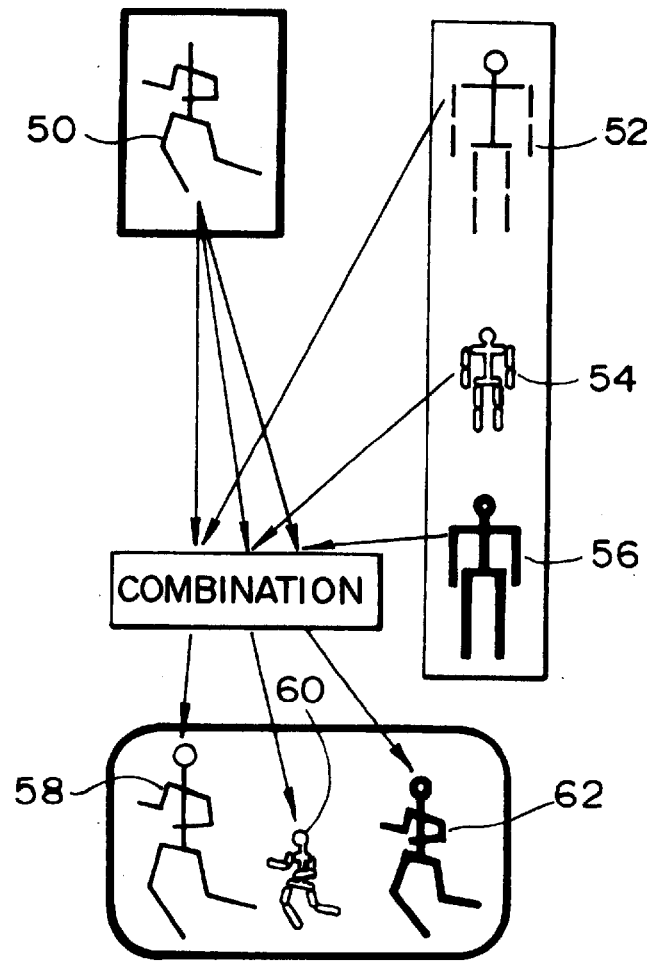

Furthermore, this embodiment is characterized in that any combination of information for identifying a method for an actor, information for identifying a model of a display object represented by an actor, and disposition information for a display object represented by an actor, is changeable in real time. For example, it is possible to combine script 1, model 1, and disposition 1, then switch to a combination of script 2, model 1, and disposition 2, as shown in FIG. 10A. This is because an actor structure such as that shown in FIG. 7 is provided for each actor by this embodiment, and the script ID, model group ID, and disposition information (position and direction information) in this actor structure can be modified for each actor in real time. For example, a variety of display objects 58, 60, and 62 can be implemented by combining a motion 50, described by a script, with models 52, 54, and 56. Conversely, a plurality of motions could be combined with one model. For example, the motions of leg portions of a character walking on level ground could be switched to a stair-climbing motion when the character encounters stairs. The degree of variety can be further increased by further combining disposition information with these motions. The thus-configured embodiment makes it possible to implement images that are full of variety, by using a small quantity of motion information, model group information, and disposition information.

Furthermore, this embodiment makes it possible for an actor to duplicate itself or erase itself, by using this information for identifying an actor.

Figure 11A:
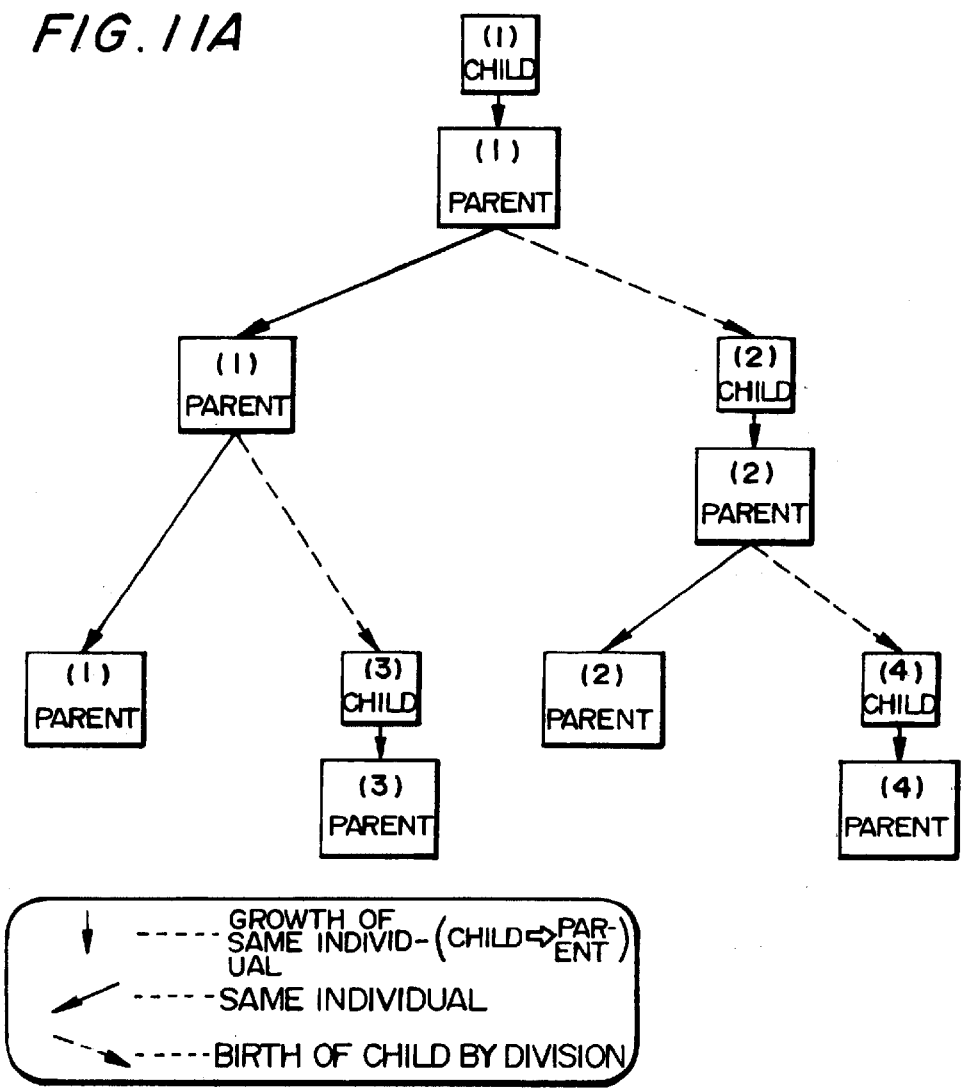
FIGS. 11A and 11B illustrate the concepts of self-duplication and self-destruction.

In a microbe division simulation shown in FIG. 11A, for example, a child (1) grows into a parent (1), and another child (2) divides off from the parent (1). A child (3) further divides off from the parent (1) and also a child (4) divides off from a parent (2) that has grown from the child (2). This simulation could be defined in the every_time part of the script for the actors in such a manner that "createActor $myself" is executed under certain conditions, for example. During this duplication, necessary information such as position information and rotation information can be copied to each actor that is to be duplicated.

Figure 11B:
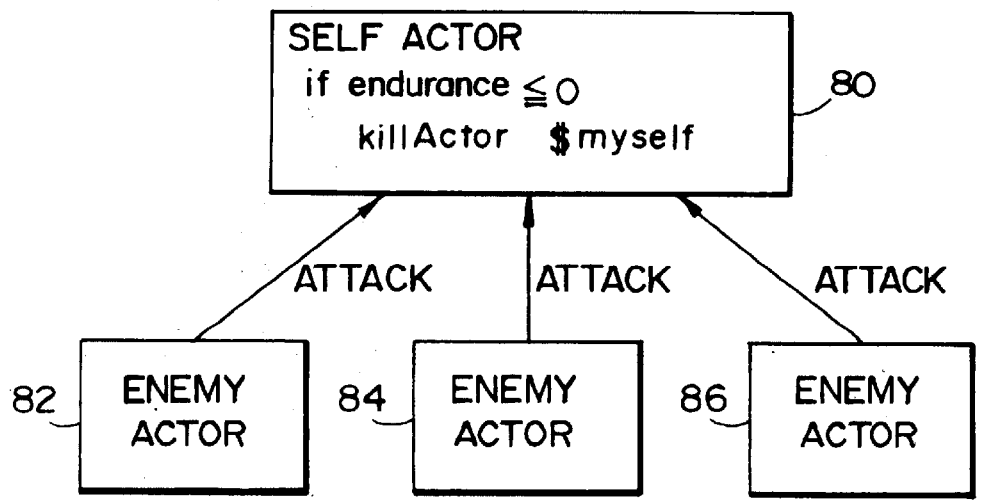

In FIG. 11B, a self actor 80 is being attacked by enemy actors 82, 84, and 86. In this case, the self actor 80 holds its own endurance as an actor variable, and this endurance decreases every time there is an attack from the enemy actors 82, 84, and 86. The self actor 80 monitors this endurance in the every_time part, for example. When a condition such that the endurance is less than or equal to zero is satisfied, the actor executes "killActor $myself" to erase itself (after executing an effect such as an explosion pattern display that is described within kill_only, for example). This configuration makes it possible to increase the independence of actors so that they can erase themselves without having to execute an external command to kill them off, thus simplifying the programming.

5. Scripts

This embodiment of the invention is provided with level-1 scripts and level-2 scripts, as shown in FIGS. 12A and 12B, as dedicated scripts for defining actors. One level-1 script and one level-2 script corresponds to each actor. In other words, defining a script is equivalent to designing an actor.

A level-1 script is used for describing the method for the movements of a display object. More specifically, it comprises key frame information, interpolation method information, and inter-model hierarchical structure information. In FIG. 12A, it defines details such as frame numbers, interpolation method (Hermitian interpolation, linear interpolation, and fixing of certain values) with respect to each item of position information (tx, ty, tz) and rotation information (rx, ry, rz) for a torso of a display object, for example. Similarly, a parent object name and these frame numbers and interpolation method for each item of position information and rotation information are defined for leg 1, leg 2, and other body parts of the display object. This embodiment of the invention can create motion information between key frames in real time by using the specified interpolation method and key frame motion information of the display object, saving the storage capacity to be required.

A level-2 script, on the other hand, is used for describing actor variables (member variables) and method. More specifically, it comprises parts for declaring actor variables and parts such as create_only, fire_only, every_time, sleep_only, kill_only, and die_only, as shown in FIG. 12B. An actor variable part declares a variable that is valid for that actor alone. Such an actor variable is equivalent to a member variable of an object in an object orientated system. Each of the create_only, fire_only, every_time, sleep_only, kill_only, and die_only parts describes what that actor does when it is generated, when it is activated, when it is executed every unit time, when it sleeps, when it is killed, and when it dies of old age. These parts are equivalent to methods of an object in an object orientated system.

One characteristic of this embodiment is the provision of a variety of parts as predefined methods, such as create_only, fire_only, and every_time. Since there is a predefined every_time method, for example, a created actor can move about autonomously, without being managed by its parent actor, subject only to the management of the actor management section 110. In other words, once an actor has been simply created and put into the virtual world, it autonomously executes actions that are described in the predefined method so that if it is killed, for example, it executes its own post-processing and disappears from the virtual world. This provision of predefined methods and the management by the actor management section 110 of actor generation, activation, execution in every unit time or the like makes it possible to operate actors having class structures as multiple processes.

In addition to these predefined methods, this embodiment also provides user-defined methods. A example of such a user-defined method is actor_func. A user-defined method is equivalent to a member function in an object orientated system, and the user can define it freely.

Note that automatic variables in C programming language can also be used in each method. In addition, if a static variable is declared, that static variable can be used is common between actors using that script in common.

It is not necessary to include all the parts such as create_only and fire_only in a script; the user need only include those parts that are desired. Omitted parts basically mean "do nothing."

This embodiment also provides predefined variables, predefined functions, and the like. A predefined variable is expressed as, for example, "$+alphanumerics" and represents a system-related variable that is often used. A predefined variable is a reserved word that cannot be used as an actor variable. It is formed of two portions either side of a period "." where the first portion represents the owner of an actor structure and the second portion represents a member of the actor structure. For example, $MY.RID and $PA.VID represent the real ID of the self actor and the virtual ID of that actor's parent, respectively. The provision of these predefined variables makes it possible to simplify the writing of a script.

Functions for actor manipulation, actor-to-actor communications (e.g., messages), and system board control (e.g., drawing or sounds) are provided as predefined functions. The actor management section 110 itself is a library in which these functions are collected. Some of these actor manipulation functions are: createActor (which creates an actor), fireActor (which activates an actor), crefireActor (which creates and activates an actor), loopActor (puts an actor in loop execution mode), pauseActor (halts time for an actor), fgActor (displays an actor), stopActor (stops the activities of an actor), contActor (restarts the activities of an actor), and changeAparent (changes the parent actor of a specified actor). In addition there are: setAvid (which sets the virtual ID of an actor); setAmdlg (which sets the model group of an actor); setAttlfrm (which set the age of an actor); setAtx, setAty, and setAtz (which set the coordinates of an actor); and setArx, setAry, and setArz (which set the rotations of an actor).

It should be noted that, in this embodiment, a member variable for a level-1 actor in an object orientated system is represented by a member of an actor structure, and a method in an object orientated system is represented by a level-1 script, as shown in FIG. 13. On the other hand, a member variable for a level-2 actor is represented by a member of an actor structure and an actor variable description part of a level-2 script, and a method is represented by a level-2 script. A member of an actor structure can be represented by an actor variable, but the actor management implemented by the actor management section 110 is made more efficient by providing the minimum necessary number of variables for all the actors in a structure format.

Figure 14A:
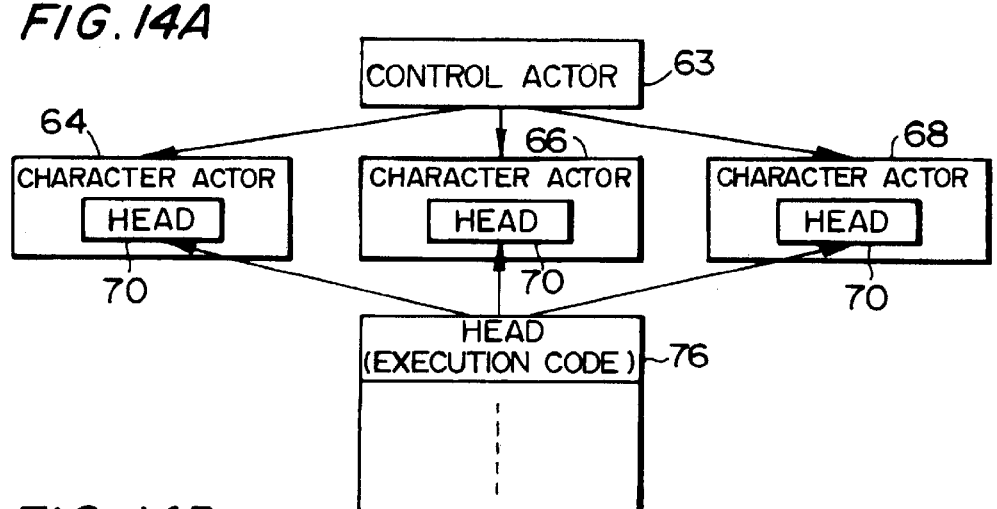
FIG. 14A illustrates the concept of a storage region for the execution code of a method used in common by a plurality of actors.

In addition, with this embodiment, execution code for a method used in common by a plurality of actors which can be executed in parallel as processes is stored at the same storage region. For example, character actors 64, 66, and 68 are executed in parallel as processes under the control of a control actor 63, as shown in FIG. 14A. The character actors 64, 66, and 68 have a common head and so a common head script (method) 70 is used therefor. In this case, the execution code for the head script that is used in common is stored in the same storage region 76 by this embodiment. If a plurality of processes are activated by the same program in a multi-processing system such as Unix, execution code for that number of activated processes is stored in the storage region. If, for example, four processes are activated, four storage regions are reserved for them. In contrast thereto, this embodiment of the invention uses the same storage region to store execution code for a method common to actors that have been activated as multiple processes, making it possible to save on the amount of storage capacity required therefor.

Figure 14B:
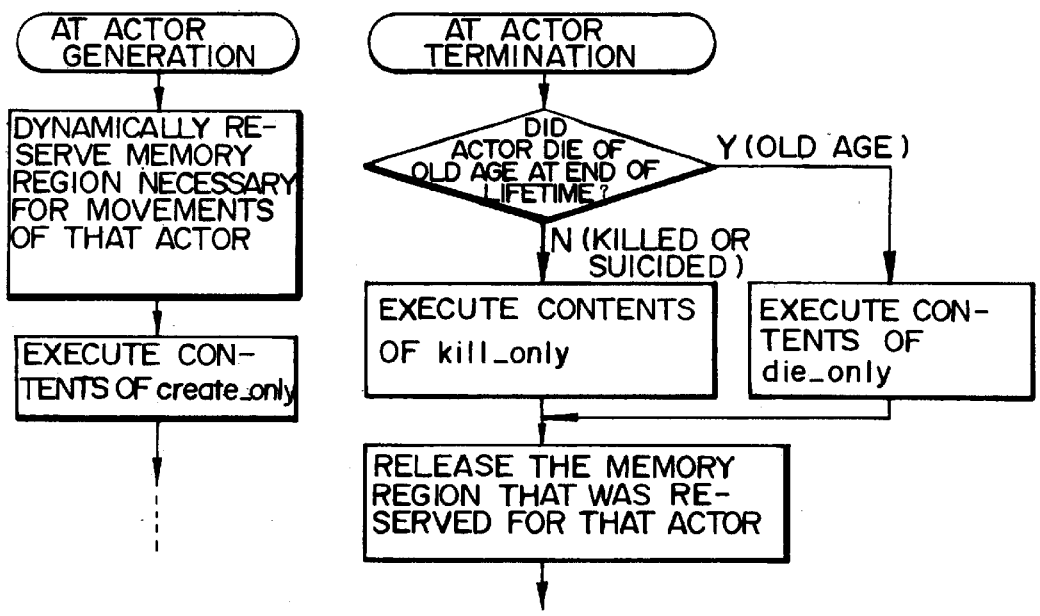
FIG. 14B illustrates the reservation of a storage region at actor generation and the release of that storage region at actor termination.

Furthermore, this embodiment reserves a storage region necessary for the execution of an actor at actor creation and releases the thus-reserved storage region at actor termination (when it is killed or dies), as shown in FIG. 14B. In other words, since a storage region necessary for the activities of an actor is automatically reserved and released, the user does not need to perform dynamic memory management. A storage region that has been used previously but is no longer in use can be reused by future actors. In other words, a large number of storage regions are generally used when there is a large number of actors, but a small number of storage regions are used otherwise. Therefore, together with the technique for storing execution code for a method common to a plurality of actors in the same storage region, as described with reference to FIG. 14A, this technique can save on the amount of storage capacity required therefor.

Figure 14C:
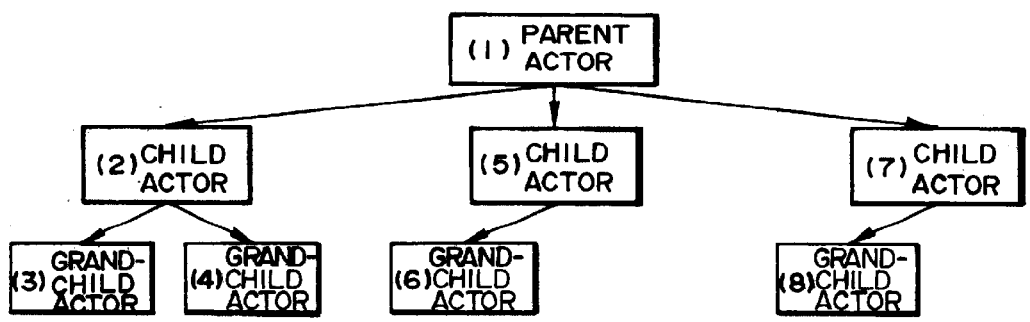
FIG. 14C illustrates switching of execution when every_time is executed.

This embodiment also switches the processing of actor methods in sequence from top to bottom of a hierarchical structure of actors, when execution is done in every unit time (frame) of the actors. In other words, taking the example shown in FIG. 14C, the processing of actor methods is switched during the execution of every_time in the sequence: (1), (2), (3), (4), (5), (6), (7), (8). More specifically, a recursive call is done within a function such that: "when a certain actor is processed, then the children of that actor are processed in sequence." If the initial "certain actor" is taken to be the "root actor" (equivalent to (1) in FIG. 14C), the processing moves in sequence through children, grandchildren, great-grandchildren, and so on, until finally the processing of all the actors configuring the tree structure has ended (this is the processing within one frame). This makes it possible to simplify actor management during execution within every unit time of the actors. In addition, this makes it possible for the influence of a parent actor to affect a child actor.

6. Actor-to-Actor Communications

Two types of actor-to-actor communications are provided in this embodiment of the invention: message communications and mail communications.

(1) Message Communications (hereinafter simply called "messages")

A message is sent from a sender actor to a recipient actor; the contents of the message are received immediately. Messages are sent asynchronously. This is mainly used for sending a request to be processed instantly, such as the execution of a method call with respect to that actor immediately after the sending. Note that, as already described with reference to FIG. 14C, the basic sequence of processing of actors within one frame (or one field) usually follows the hierarchical structure recursively from parent actor to child actors, so messages can also be used to transfer information from a parent actor to a child actor within the same frame.

The main part of each message is a structure that can be freely defined by the user. Note, however, that it is not possible for one actor to accept a plurality of messages simultaneously.

(2) Mail Communications (hereinafter simply called "mail")

Mail is sent from a sender actor to a recipient actor; the contents of the mail always reach the recipient after a delay of one frame (or one field). Mail is sent synchronously. This is mainly used by matching the timing between actors, to request processing or transfer information. The main part of each mail item is a structure that can be freely defined by the user. It should be noted, however, that one actor can accept a plurality of mail items simultaneously. Since a mail header is affixed for synchronous communications and additional information, a mail item is larger in size than a message.

Note that the agents of both messages and mail are actors, which means that they can be given roles (display on the screen, emit a sound, activate other actors, etc.) other than overwriting (with automatic translation function) or text delivery, so that a variety of smart messages and mail can be implemented.

7. Actor Management Section (Interpreter)

Figure 15:
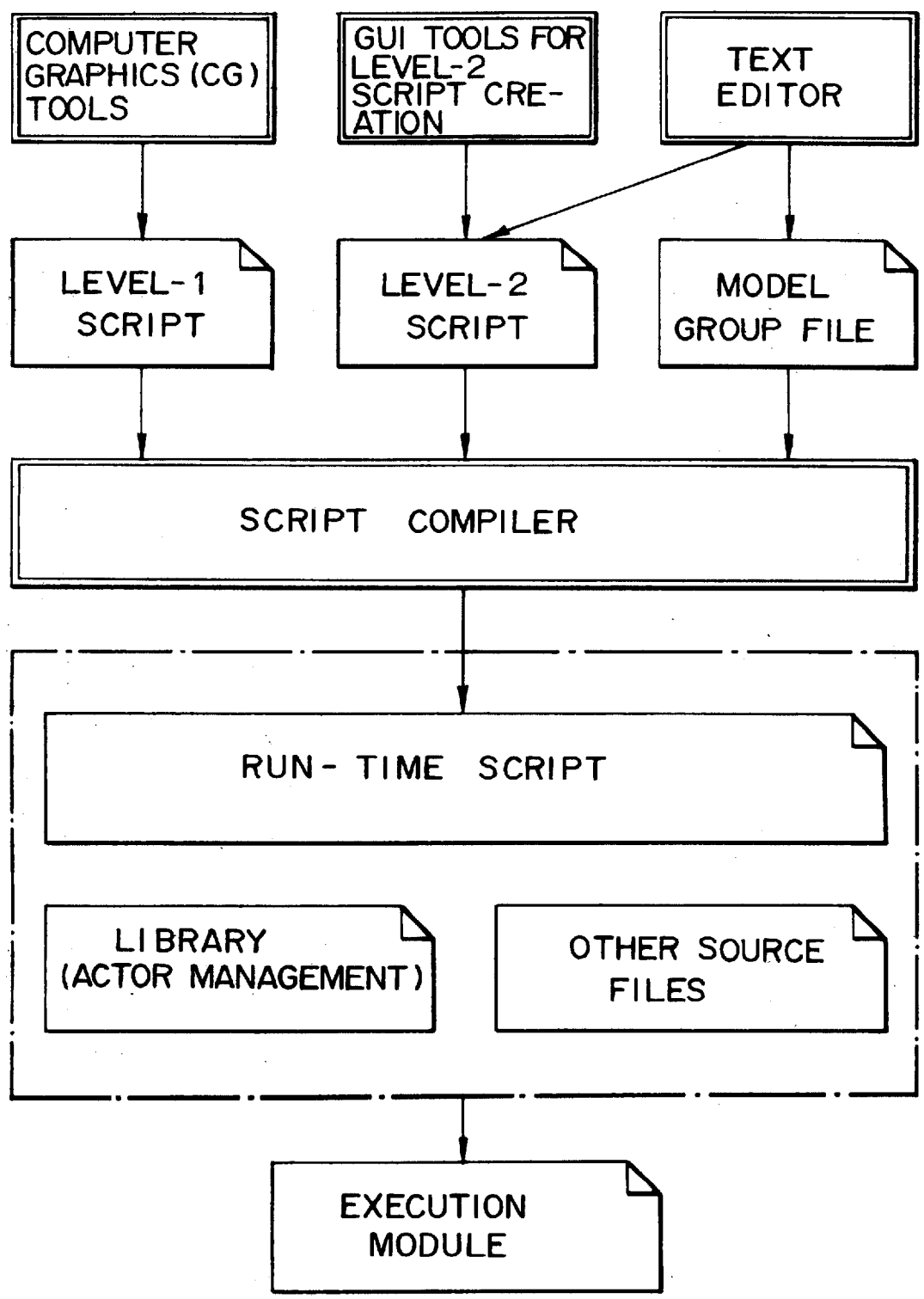
FIG. 15 illustrates the linking of the actor management section, which is a library, to an application program.

The actor management section is equivalent to a standard program for managing actors. Its entities are a group of functions (a library) which are linked to the execution module of an application program, for example, and which are written in a language such as C. The programmer can use certain CG tools to write level-1 scripts and a text editor to write level-2 scripts and model group files, as shown in FIG. 15. It should be noted, however, a dedicated script-writing application that utilizes a GUI could also be used to write level-2 scripts. These level-1 scripts, level-2 scripts, and model group files are then compiled by a script compiler, to convert them into a run-time script. This run-time script is linked to the actor management section, which is a library, and to other source files, to obtain the final execution module.

Figure 16:
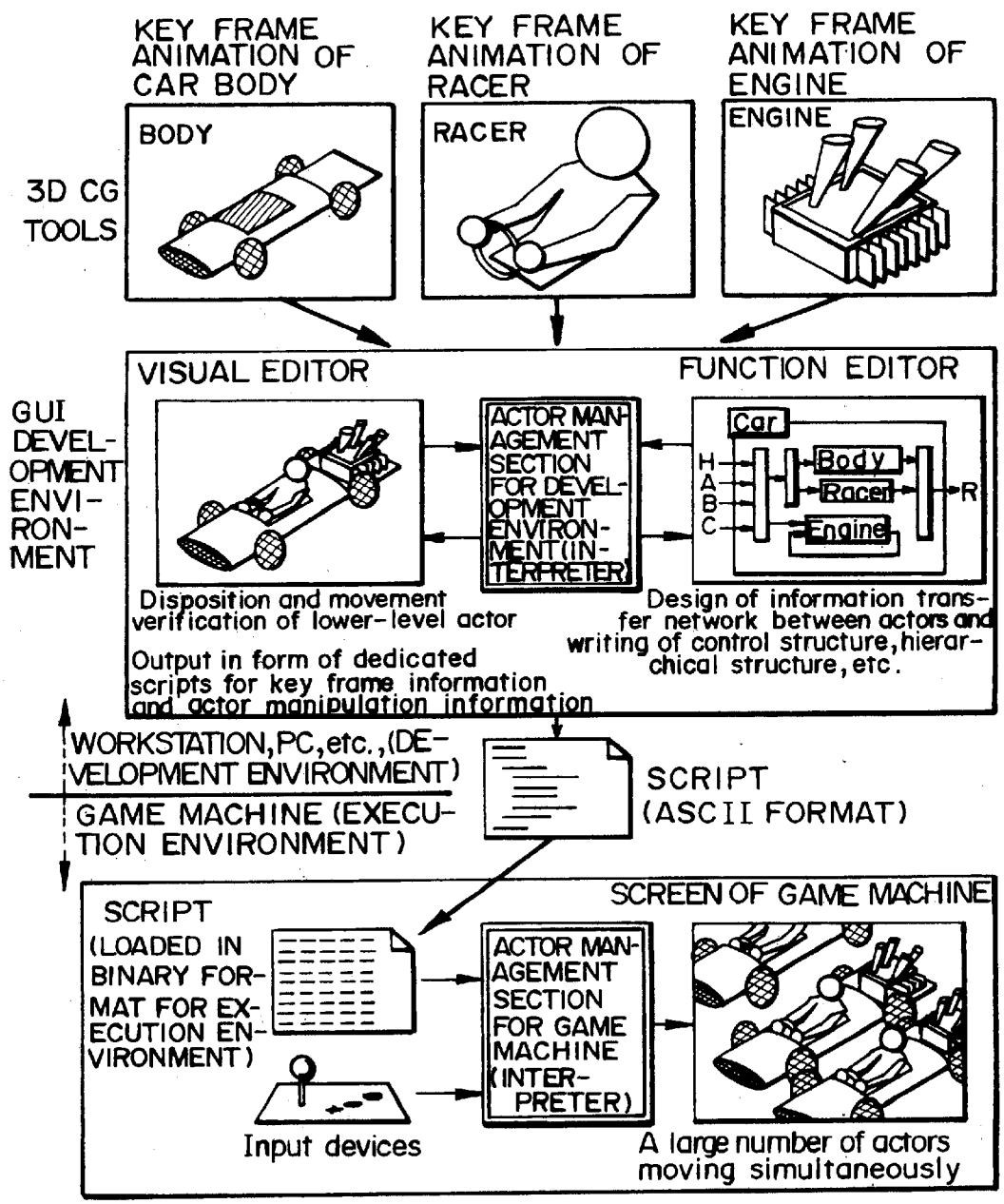
FIG. 16 illustrates the common use of a script in an development environment and an execution environment.

The actor management section can be linked to the application program in either the development environment on a workstation or personal computer, or in the execution environment on a game machine, as shown in FIG. 16. This enables accurate reproduction of the operations in the development environment in the execution environment, further simplifying the development.

A characteristic of the actor management section of this embodiment lies in the way in which the same script which describes a method of an actor can be executed on different hardware resources. Use of the actor management section of this embodiment makes it possible to run the same script on the hardware resources (WS, PS) used for the development environment and the hardware resources (game machine) used for the execution environment, for example. This is because differences in hardware resources are assimilated by the actor management section. A script developed for a first game machine can easily be used on a second game machine. This makes it possible to simplify the porting of an application program to another device.

Note that the actor management section operates as an interpreter for a level-1 script. In other words, it reads key frame information and interpolates successively therefrom to derive motion information.. In addition, it could also operate as an interpreter for level-2 scripts, for successively interpreting and executing instructions, but in this embodiment a C compiler is used temporarily therefor (in other words, these scripts are executed as compiler language).

The main tasks of the actor management section are described below.

(a) Actor Management

It accepts and executes requests for creation, activation, execution per unit time, sleep, halt, restart, or termination of actors. It also manages a hierarchical structure of actors and sets the various items of information to be stored in an actor structure.

(b) Storage Management

Dynamically reserves and releases storage regions used by actors. This relieves the user of the task of providing complicated storage management, improving the efficiency of the programming work.

(c) Actor-to-Actor Communications

Provides a delivery service for messages and mail.

(d) Real-Time Interpolation

Provides a service that outputs interpolated values for various types of information within a specified frame, from data such as key frame information in the level-1 script.

(e) System Related Processing

Provides low-level system control, such as hardware initialization and screen update.

8. Shell

Figure 17A:
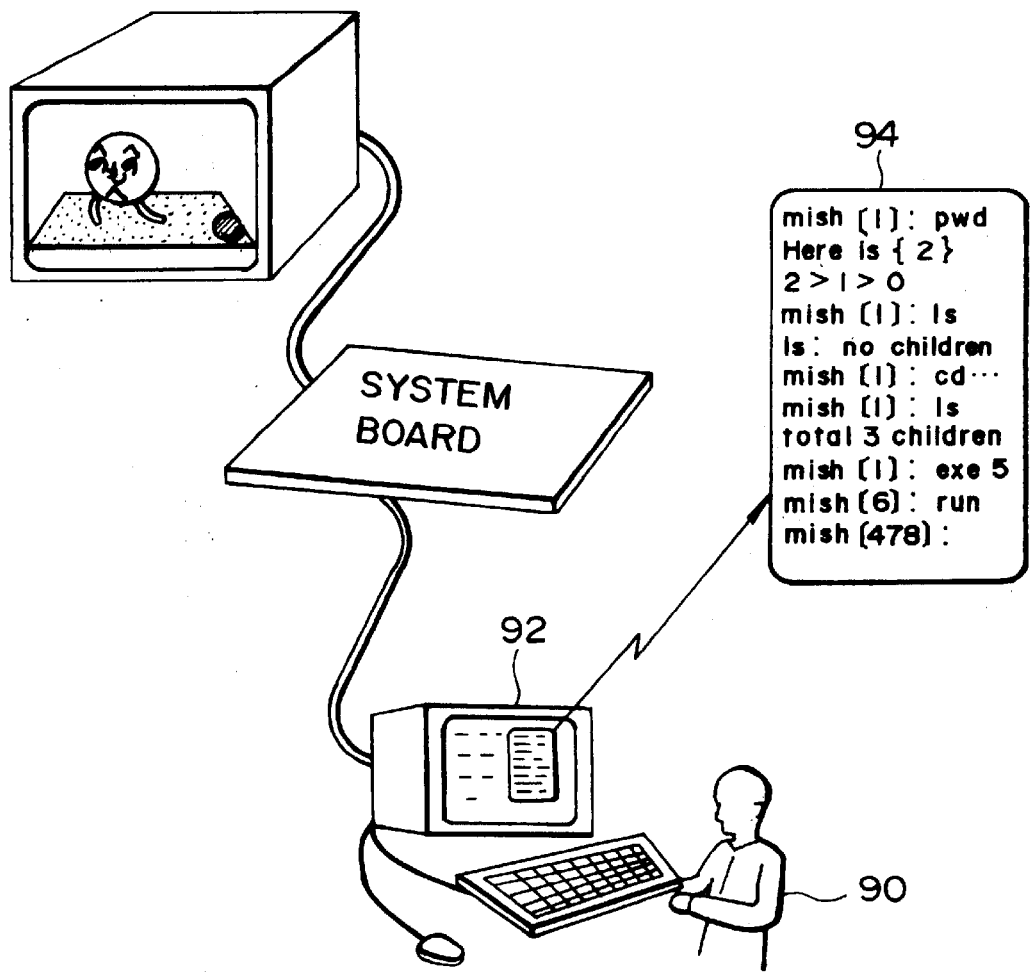
FIGS. 17A and 17B illustrate the concept of a shell.

With this embodiment of the invention, a shell (actor) 94 is provided to enable an operator 90 to use a workstation 92 or the like to interactively control the generation, activation, execution per unit time, sleep, halt, restart, or termination of actors, as shown in FIG. 17A. This shell 94 is a command interpreter that is. mainly used in a development environment. The shell 94 is a special actor that is used for moving the hierarchical structure of actors, viewing the status of each actor, killing off a specific actor. In addition, the operator 90 can use it to interactively utilize actor management related services provided by the actor management section. In other words, the shell 94 in this embodiment is an actor written by a level-2 script.

In FIG. 17A, "mish[n]" is a prompt and the number n in square brackets is the total frame count (total elapsed time) of the shell actor. The "pwd" command causes the display of the current position (current actor). The "ls" command lists all the child actors of the actor. The "exe 5" command causes the execution of only 5 frames after the current time point, and the "run" command continues the execution, provided there is no stop request.

Implementing the shell as an actor in this manner makes it possible to develop programs far more efficiently.

Figure 17B:
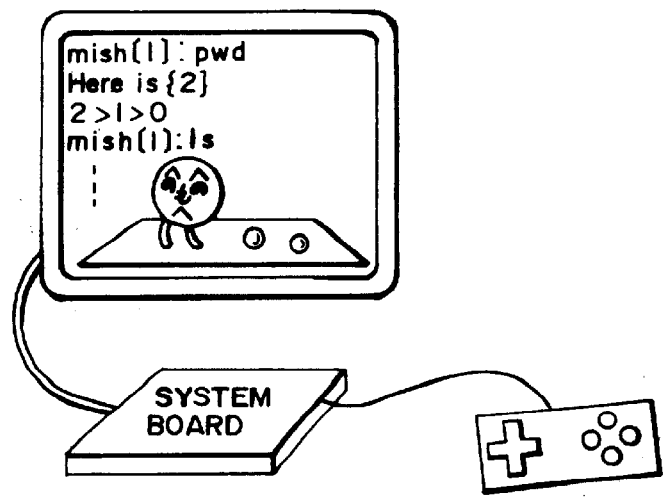

Note that the shell could be installed on a system board as shown in FIG. 17B, instead of using a workstation, and shell can be displayed on the same screen that is showing the images of display objects.

Figure 18A:
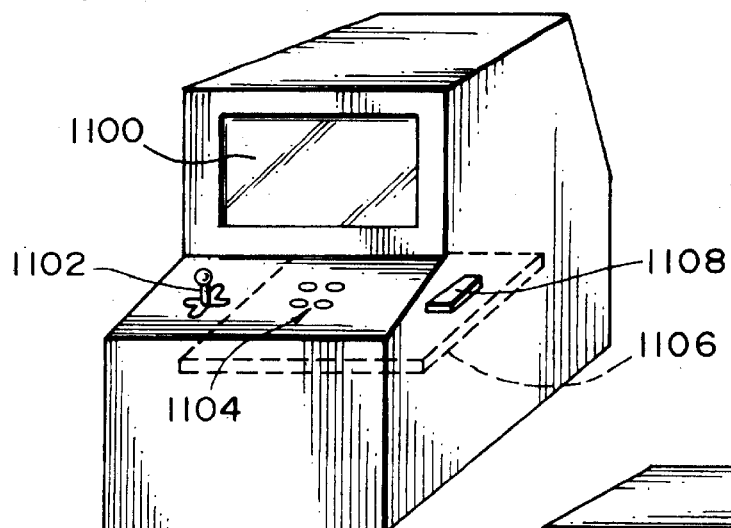
FIGS. 18A, 18B, and 18C show a variety of devices to which this invention is applied.
Figure 18B:
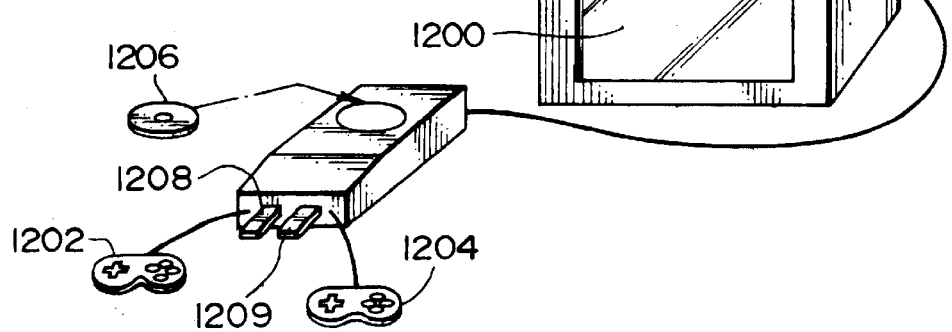
Figure 18C:
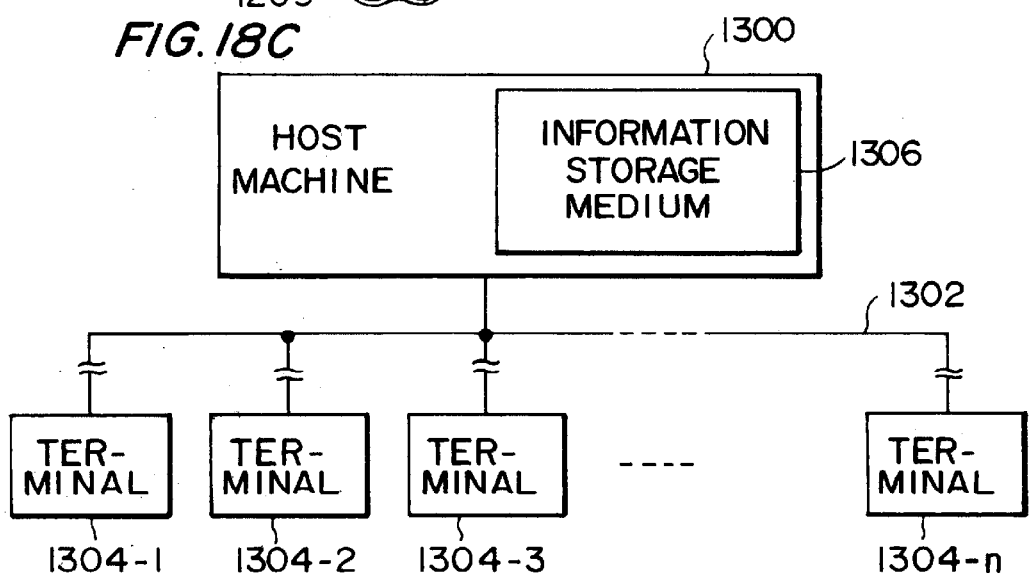

Examples of this invention applied to a variety of devices are shown in FIGS. 18A, 18B, and 18C.

An example of this embodiment applied to an arcade game machine is shown in FIG. 18A. The player enjoys this game by operating controls such as a joystick 1102 and buttons 1104 while viewing a game image shown on a display 1100. Components such as a CPU, an image generation IC, and a sound generation IC are mounted on a system board 1106 built into the device. Information is stored in a memory 1108, which is an information storage medium on the system board 1106. This information includes information for managing at least one of the generation, activation, execution per unit time, sleep, halt, restart and termination of an actor, which is a process that can be executed in parallel and is also an instance of a class; and information for generating an image that comprises a plurality of display objects, each represented by an actor. This information is hereinafter called stored information. This stored information comprises at least one type of information, such as program coding for performing the above described processing, image information, sound information, shape information for display objects, table data, list data, or player information.

An example of this embodiment applied to a domestic game machine is shown in FIG. 18B. Players enjoy the game by manipulating game controllers 1202 and 1204 while viewing a game image shown on a display 1200. In this case, the above described stored information is stored in a CD-ROM 1206 or IC cards 1208 and 1209 that -are information storage media that can be freely inserted into and removed from the main unit.

An example of this embodiment applied to a game machine is shown in FIG. 18C, where the game machine comprises a host machine 1300 and terminals 1304-1 to 1304-n connected to the host machine 1300 by communications lines 1302. In this case, the above described stored information is stored in an information storage medium 1306 such as a magnetic disk, magnetic tape, or memory that can be controlled by the host machine 1300. Each of the terminals 1304-1 to 1304-n has a CPU, an image generation IC, and a sound generation IC. If game images and sounds can be generated thereby in a stand-alone manner, a game program for generating game images and sounds is transferred to the terminals 1304-1 to 1304-n from the host machine 1300. On the other hand, if they cannot be generated in a stand-alone manner, the host machine 1300 creates the game images and sounds then transfers them to the terminals 1304-1 to 1304-n for output by those terminals.

Note that this invention is not limited to the above described embodiments and it can be implemented in various other ways.

For example, the actor management section of this embodiment was described as being a group of functions (a library) written in C programming language, but the implementation of the actor management section is not limited thereto.

Furthermore, actor management was executed in this embodiment by the provision of actor structures, but this invention is not limited thereto.

Figure 19A:
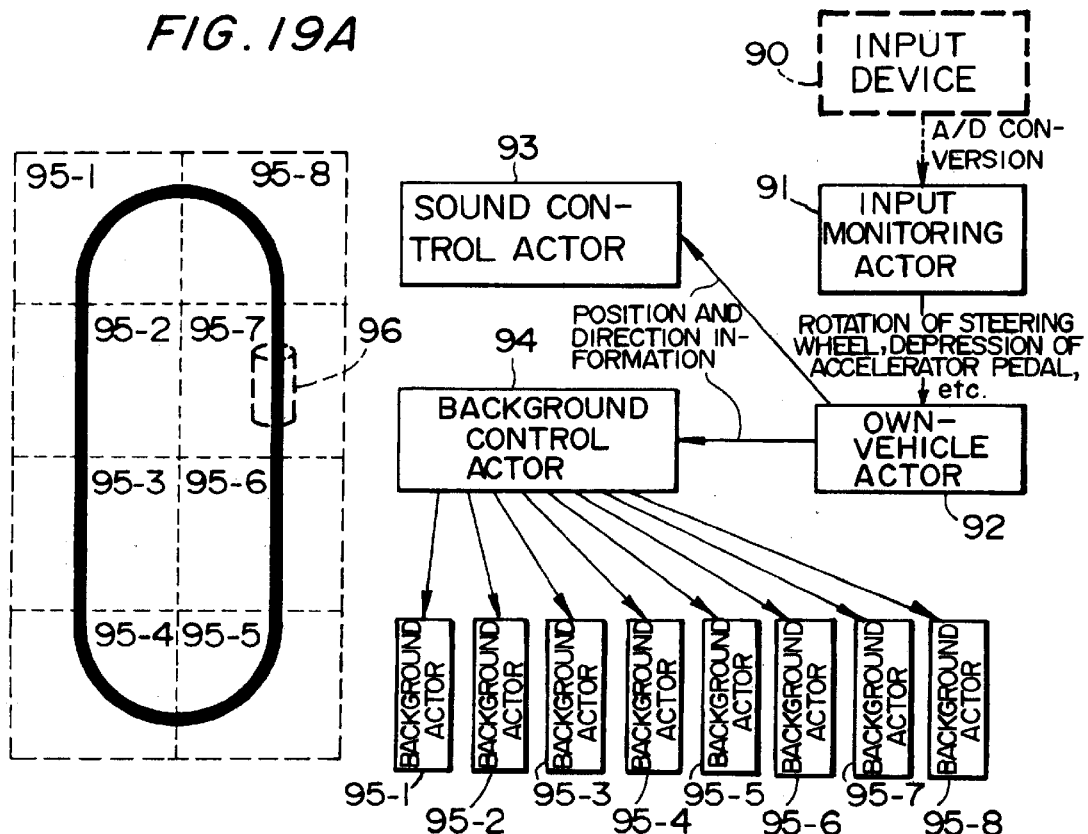
FIGS. 19A and 19B illustrate a variety of examples of image generation to which this invention is applied.
Figure 19B:
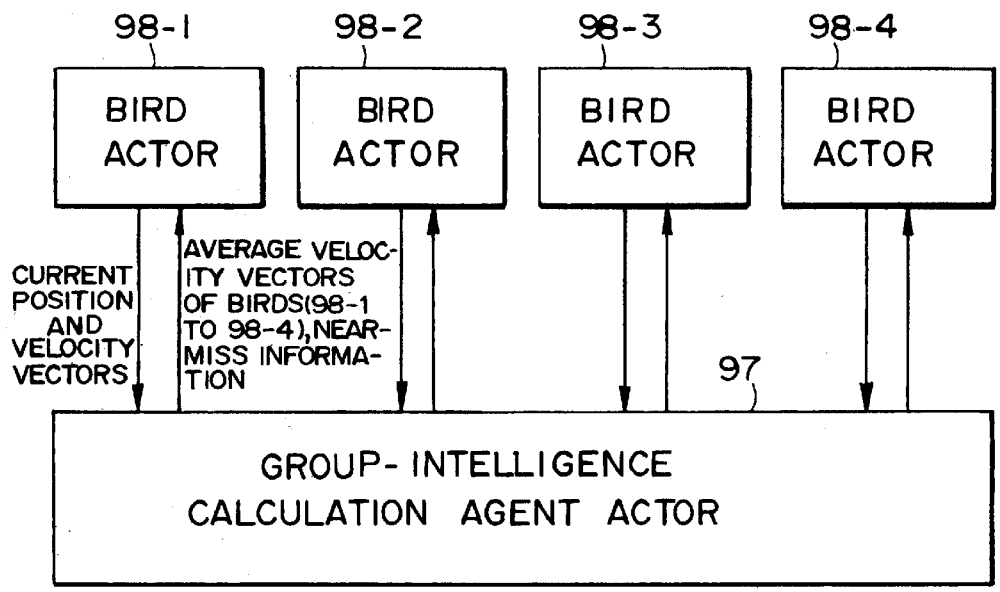

This invention can also be applied to the generation of various different image. For example, an example in which this invention is applied to the image generation of a racing game is shown in FIG. 19A. In FIG. 19A, manipulation information from input devices 90, such as a steering wheel and accelerator, are monitored by an input monitoring actor 91. Information such as the amount of rotation of the steering wheel and the amount of depression of the accelerator pedal is sent from the input monitoring actor 91 to an own-vehicle actor 92, and the own-vehicle actor 92 derives position and direction information for the player's own vehicle from the thus-sent information. This position and direction information is sent to a background control actor 94, and the background control actor 94 uses this information to control background actors 95-1 to 95-8 which are used for background displays at locations on a map and obtain background image information at the position of the player's own vehicle. The position and direction information is also sent to a sound control actor 93 and the sound control actor 93 uses this information for controlling sounds. If, for example, the player's own vehicle is positioned at the location of a tunnel 96 on the map, the sound is controlled in such a manner as to seem to come from within a tunnel. This invention can also be applied to the generation of images of birds moving in a flock, as shown in FIG. 19B. A group-intelligence calculation agent actor 97 performs calculations of rotational angles and the coordinates of the center of gravity of a flying bird. In this case, the calculations of the group-intelligence calculation agent actor 97 are based on rules such as: (1) maintain a minimum distance between the self bird and other objects in the environment, (2) match the velocity vectors of other birds in the vicinity, and (3) move in the direction of a position that seems to be the center of gravity of other birds in the vicinity. In addition, bird actors 98-1 to 98-4 move in accordance with a level-1 script that represents the flapping of a bird's wings. This invention can also be applied to the generation of images for a combat game. If character actors, skill actors, weapon actors, etc., for the combat game are provided in such a case, the amount of variety of combinations of combat game characters, skills, and weapons can be greatly increased.

Furthermore, this invention can be used in various different applications such as devices for generating computer graphics images, development tools, arcade game machines, domestic game machines, training simulators, large-scale attractions in which many players can participate, personal computers, and multimedia terminals.

In addition, although this invention is particularly effective in a three-dimensional image generation device, it can also be applied to a two-dimensional game machine.

What is claimed is:

1. An image generation device comprising:
   actor management means for managing at least one of the generation, activation, execution per unit time, sleep, halt, restart and termination of an actor which is an instance of a class and is also a process that can be executed in parallel; and
   means for generating an image including a plurality of display objects, each represented by said actor with other actors when the other actors are instances of the class.

2. The image generation device as defined in claim 1, wherein at least one of an actor for representing a display object, an actor for sound control, an actor for interface, an actor for actor-to-actor communications, and an actor for storage management is provided.

3. The image generation device as defined in claim 2, wherein said actor for sound control performs sound control based on disposition information from said actor for representing a display object.

4. The image generation device as defined in claim 1, wherein actor information is provided for each actor that is generated, said actor information including at least one of:
   information for indicating whether an actor is enabled or disabled;
   information for indicating whether display of a display object represented by an actor is enabled or disabled;
   information for indicating whether a time count of an actor is enabled or disabled;

information for indicating whether a time count loop is enabled or disabled;

information for identifying a self actor;

information for identifying a parent actor;

information for identifying a child actor;

information for identifying a method for an actor;

information for identifying a model of a display object represented by an actor;

disposition information for a display object represented by an actor;

actor-related time information;

information for identifying an actor that causes an action with respect to said self actor and the type of said action;

information relating to communications between actors; and information for identifying a storage region in which an actor's variable is stored.

5. The image generation device as defined in claim 4, wherein a plurality of types of specification information is provided as said information for identifying actors.

6. The image generation device as defined in claim 4, wherein said information for identifying a method for an actor includes at least one of information for identifying a script for describing a method of an actor and information for identifying from a plurality of methods a method to be executed every unit time.

7. The image generation device as defined in claim 4, wherein said actor-related time information includes at least one of time information relating to elapsed time from when a time count of an actor was enabled, time information relating to total elapsed time on condition that a time count loop is enabled, and time information relating to the sleeping of an actor.

8. The image generation device as defined in claim 4, wherein said actor information is stored as a structure type in a given storage region at actor generation; and wherein actor management is performed on the basis of said stored actor information.

9. The image generation device as defined in claim 4, wherein a self actor and other actors are capable of accessing said actor information.

10. The image generation device as defined in claim 4, wherein combination of said information for identifying a method for an actor, said information for identifying a model of a display object represented by an actor, and said disposition information for a display object represented by an actor is changeable in real time.

11. The image generation device as defined in claim 4, wherein an actor uses said information for identifying actors to perform at least one of self-duplication and self-destruction.

12. The image generation device as defined in claim 1 or 4, wherein at least one of:

a method executed when an actor is generated;

a method executed when an actor is activated;

a method executed every unit time;

a method executed when an actor is asleep;

a method executed when an actor is halted;

a method executed when an actor is restarted;

a method executed when an actor is forcibly terminated; and a method executed at the natural termination at the end of the lifetime of an actor is provided as a predefined actor method.

13. The image generation device as defined in claim 1 or 4, wherein a first script for describing a method of motion of a display object represented by an actor and a second script for describing an actor variable and a method are provided.

14. The image generation device as defined in claim 13, wherein a member variable for each of first actors is represented by a member of a structure that is unique to each of said first actors, and also a method of each of said first actors is represented by said first script; and wherein a member variable for each of second actors is represented by a member of a structure that is unique to each of said second actors and by said second script, and also a method of each of said second actors is represented by said second script.

15. The image generation device as defined in claim 1 or 4, wherein an execution code for a method used in common by a plurality of actors executed in parallel as processes is stored in a common storage region.

16. The image generation device as defined in claim 1 or 4, wherein a storage region necessary for the execution of an actor is reserved at actor generation; and wherein the thus-reserved storage region is released at actor termination.

17. The image generation device as defined in claim 1 or 4, wherein the execution of methods of actors is switched in sequence from top to bottom of a hierarchical structure of actors, during execution at every unit time for actors.

18. The image generation device as defined in claim 1 or 4, wherein said actor management means is a library that is linked to an execution module of an application program.

19. The image generation device as defined in claim 1 or 4, wherein said actor management means has means for executing the same script, in which is described a method of an actor, on different hardware resources.

20. The image generation device as defined in claim 1 or 4, wherein an actor for enabling an operator to interactively control at least one of the generation, activation, execution per unit time, sleep, halt, restart, and termination of an actor, and said disposition information is provided.

21. An information storage medium for generating an image, comprising:

information for managing at least one of the generation, activation, execution per unit time, sleep, halt, restart and termination of an actor which is an instance of a class and is also a process that can be executed in parallel with other actors when the other actors are instances of the class; and information for generating an image including a plurality of display objects, each represented by said actor.

22. The information storage medium as defined in claim 21, wherein actor informations provided for each actor that is generated, said actor information including at least one of:

information for indicating whether an actor is enabled or disabled;

information for indicating whether display of a display object represented by an actor is enabled or disabled;

information for indicating whether a time count of an actor is enabled or disabled;

information for indicating whether a time cunt loop is enabled or disabled;

information for identifying a self actor;

information for identifying a parent actor;

information for identifying a child actor;

information for identifying a method for an actor;

information for identifying a model of a display object represented by an actor;

disposition information for a display object represented by an actor;

actor-related time information;

information for identifying an actor that causes an action with respect to said self actor and the type of said action;

information relating to communications between actors; and information for identifying a storage region in which an actor's variable is stored.

* * * * *